(12) United States Patent
Sugawara et al.

(10) Patent No.: US 6,818,339 B1
(45) Date of Patent: Nov. 16, 2004

(54) POLYMER ELECTROLYTE TYPE FUEL CELL

(75) Inventors: Yasushi Sugawara, Higashiosaka (JP); Hisaaki Gyoten, Shijonawate (JP); Makoto Uchida, Hirakata (JP); Eiichi Yasumoto, Kyoto (JP); Teruhisa Kanbara, Ikeda (JP); Junji Morita, Moriguchi (JP); Yoshihiro Hori, Ikoma (JP); Akihiko Yoshida, Hirakata (JP); Hidenobu Wakita, Yawata (JP); Hiroki Kusakabe, Sakai (JP); Masato Hosaka, Osaka (JP); Osamu Sakai, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 346 days.

(21) Appl. No.: 10/049,567

(22) PCT Filed: Aug. 24, 2000

(86) PCT No.: PCT/JP00/05729
§ 371 (c)(1),
(2), (4) Date: Feb. 15, 2002

(87) PCT Pub. No.: WO01/17047
PCT Pub. Date: Mar. 8, 2001

(30) Foreign Application Priority Data

| Aug. 27, 1999 | (JP) | 11/242133 |
|---|---|---|
| Oct. 6, 1999 | (JP) | 11/285553 |
| Oct. 21, 1999 | (JP) | 11/299645 |
| Nov. 8, 1999 | (JP) | 11/316723 |

(51) Int. Cl.$^7$ .............................................. H01M 4/02
(52) U.S. Cl. ........................... 429/30; 429/40; 429/209
(58) Field of Search .............................. 429/29, 30, 34, 429/38, 39, 40, 41, 42, 43, 209, 231.8, 407; 428/403, 407

(56) References Cited

U.S. PATENT DOCUMENTS

| 5,500,292 A | * | 3/1996 | Muranaka et al. ........... 429/209 |
| 6,218,035 B1 | * | 4/2001 | Fuglevand et al. ........... 429/30 |
| 6,399,202 B1 | * | 6/2002 | Yu et al. ..................... 428/403 |

FOREIGN PATENT DOCUMENTS

| EP | 0 560 295 A1 | 9/1993 |
| EP | 0 869 568 A1 | 10/1998 |
| EP | 0 872 906 A1 | 10/1998 |
| JP | 60-193269 | 10/1985 |
| JP | 6-52871 | 2/1994 |
| JP | 8-117598 | 5/1996 |
| JP | 9-245801 | 9/1997 |
| JP | 9-245802 | 9/1997 |
| JP | 9-283153 | 10/1997 |
| JP | 11-67225 | 3/1999 |
| JP | 11-135133 | 5/1999 |
| JP | 11-154523 | 6/1999 |

* cited by examiner

Primary Examiner—Michael Barr
Assistant Examiner—Monique Wills
(74) Attorney, Agent, or Firm—McDermott Will & Emery LLP

(57) ABSTRACT

The present specification discloses a polymer electrolyte fuel cell characterized in that each of the cathode and the anode comprises catalyst particles, a hydrogen ion-conductive polymer electrode, a conductive porous base material and a water repellent agent, and water repellency of at least one of the cathode and the anode varies in a direction of thickness or in a plane direction. As such, by varying the degree of the water repellency of the cathode and the anode on the basis of a position, an excellent polymer electrolyte fuel cell having a high discharge characteristic or more specifically a high current-voltage characteristic in a high current density range.

18 Claims, 14 Drawing Sheets

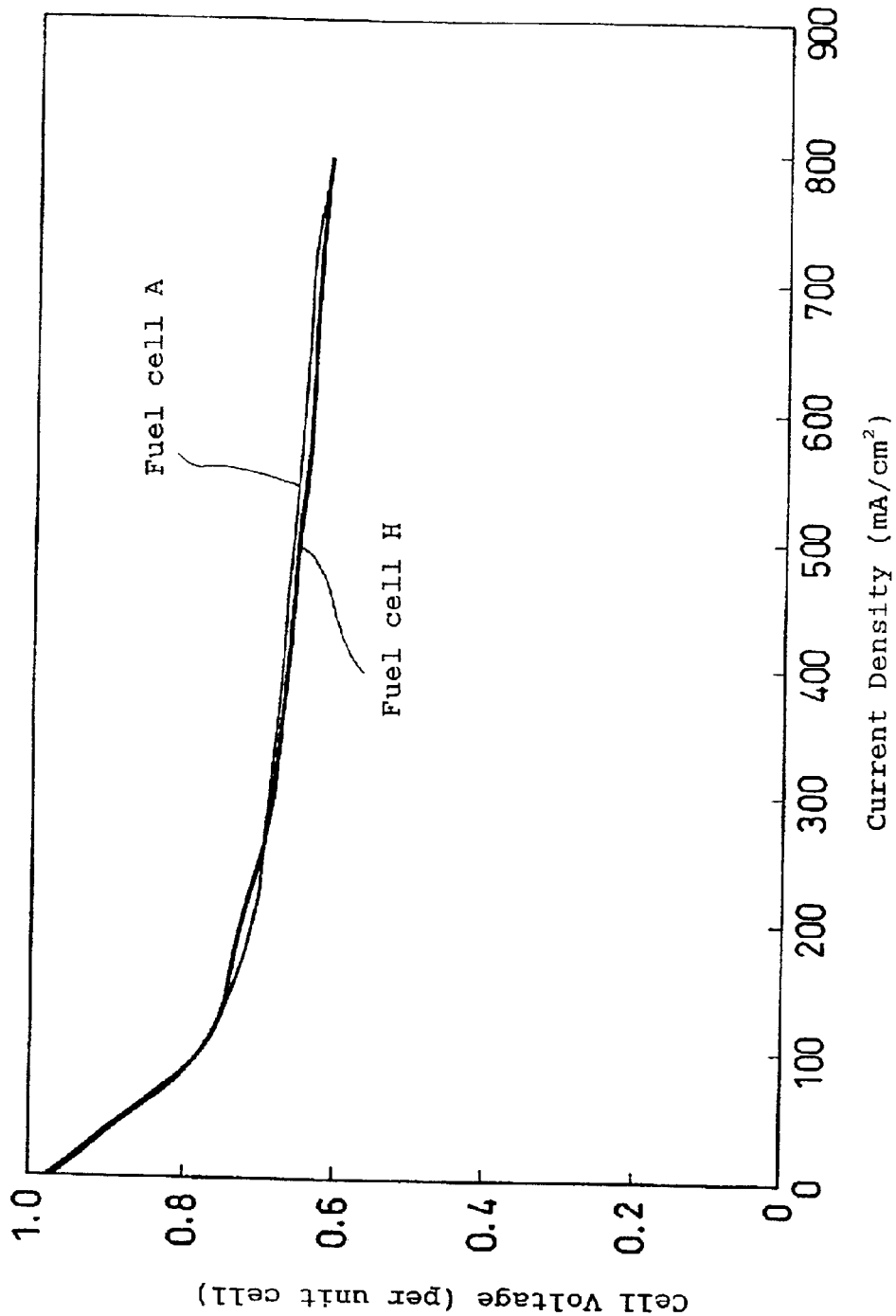

POLYMER ELECTROLYTE TYPE FUEL CELL

TECHNICAL FIELD

The present invention relates to a room temperature-activating polymer electrolyte fuel cell used in portable power sources, power sources for electric vehicles, and domestic co-generation systems.

BACKGROUND ART

Polymer electrolyte fuel cells simultaneously generate electric power and heat through electrochemical reactions of a hydrogen-containing fuel gas and an oxygen-containing oxidant gas, such as the air.

To manufacture this fuel cell, a catalyst layer mainly composed of carbon powder with a platinum metal catalyst carried thereon is formed in first on both faces of a polymer electrolyte membrane that selectively transports hydrogen ions. Subsequently, a gas diffusion layer having both gas permeability and electron conductivity relative to either the fuel gas or the oxidant gas is formed on outside each catalyst layer, giving an electrode composed of the catalyst layer and the gas diffusion layer. The joint body of the electrodes and the electrolyte membrane is referred to as an MEA.

In order to prevent leakage of the supplied gas and mixing of the fuel gas and the oxidant gas, gaskets are disposed across the polymer electrolyte membrane to surround the electrodes. In some cases, the gaskets, the electrodes, and the polymer electrolyte membrane are integrated with one another as the MEA.

Each MEA is interposed between a pair of conductive separator plates, which mechanically fix the MEA and electrically connect the adjoining MEAs with each other in series. A gas flow path is formed in a portion of the separator plate that is in contact with the MEA to feed a supply of the reaction gas to the electrode plane and flow out the produced gas and the remaining excess gas. The gas flow path may be separately attached to the separator plate, but generally a groove is formed on the surface of the separator plate to function as a gas flow path.

The conductive separator plate is required to have high electron conductivity, gas tightness, and high corrosion resistance and the prior art technique thus forms a groove in a dense carbon plate by cutting or another adequate working process to complete the conductive separator plate.

The gas flow path formed in the prior art conductive separator plate generally has multiple linear gas flow paths (straight flow paths) in parallel running from the gas inlet to the gas outlet. In the polymer electrolyte fuel cell, water is produced on the cathode during the operation and, therefore, there is a problem that efficient removal of the product water is required for exertion of the sufficient cell performance. The length of each gas flow path is accordingly extended by decreasing the sectional area of the gas flow path formed in the conductive separator plate and forming a meandering gas flow path (serpentine flow path). This practically raises the gas flow rate and forcibly removes the product water, thereby improving the cell performance.

A plurality of the above single cells are laid one upon another to form the structure of cell stack when fuel cell is used. Heat as well as electric power is generated during the operation of the fuel cell, and a cooling plate is accordingly provided for every one or two single cells in the cell stack, in order to keep the cell temperature at a substantially fixed level and allow utilization of the simultaneously generated thermal energy.

A thin metal plate having the structure that allows circulation of a thermal medium inside thereof, such as cooling water, is generally used for the cooling plate. A flow path for cooling water is formed on the rear face of the conductive separator plate included in the single cell, that is, on a specific face of the conductive separator plate where a cooling water may be flowed, and this conductive separator plate may be used as the cooling plate. At that time, an O-ring or a gasket is required for sealing the thermal medium like cooling water. In this case, the O-ring should be pressed completely to ensure the sufficient electrical conductivity across the cooling plate.

The cell stack requires an aperture called manifold for supplying and discharging the fuel gas and the oxidant gas to the respective single cells. The inner manifold structure, in which an aperture for supplying and discharging the cooling water is formed inside the cell stack, is typically adopted.

In the either of the inner manifold structure and the outer manifold structure, it is necessary that a plurality of single cells including the cooling sections are stackd in one direction to form a stack (cell stack) and a pair of end plates are arranged on both ends of the stack and are fixed with a clamping rod.

In case of clamping by using the clamping rod, it is desirable to evenly clamp the single cells in the plane direction. From the viewpoint of mechanical strength, a metal material such as stainless steel is typically used for the end plates and the clamping rod. These end plates and the clamping rod are electrically insulated from the stack via an insulator, so that the electric current does not leak outside via the end plates. The clamping rod may be inserted in a through hole formed in the separator plates. It is also proposed that the whole stack may be clamped via the end plates with a metal belt.

In the polymer electrolyte fuel cell thus obtained, the electrolyte membrane functions as the electrolyte in the wet state, and the supplies of the fuel gas and the oxidant gas should thus be humidified. In the temperature range up to at least 100° C., the higher water content of the polymer electrolyte membrane increases the ion conductivity and lowers the inner resistance of the cell, thus ensuring the high performance.

Supply of a high humid gas at temperatures higher than the cell driving temperature, however, causes sweating inside the cell and the water drops undesirably interfere with the smooth gas supply. Water is produced by power generation on the cathode, to which the supply of the oxidant gas is fed, and thus there is a problem that the efficiency of removal of the product water and the cell performance are lowered. The supply of gas is thus generally humidified to have the dew point a little lower than the cell driving temperature.

As typical method of humidifying the gas supply, there are a bubbler humidification process that bubbles the supply of gas in deionized water kept at a predetermined temperature for humidification and a membrane humidification process that makes a flow of deionized water kept at a predetermined temperature in one face of a membrane that allows easy transfer of the water content, such as an electrolyte membrane, while making a flow of the gas supply in the other face for humidification. When a gas obtained by steam reforming a fossil fuel like methanol or methane is used for the fuel gas, steam is included in the reformed gas and humidification is thus not required in such cases.

The humidified fuel gas and oxidant gas are supplied to the polymer electrolyte fuel cell for power generation. There is a current density distribution in a single plane of an arbitrary single cell in the cell stack. The fuel gas is humidified and then fed into the fuel cell via a gas inlet and power generation consumes hydrogen included the fuel gas. This leads to a phenomenon of a higher hydrogen partial pressure and a lower steam partial pressure in the upper stream of the gas flow path and a lower hydrogen partial pressure and a higher steam partial pressure in the lower stream of the gas flow path.

The oxidant gas is humidified and then fed into the fuel cell via a gas inlet and power generation consumes oxygen included in the oxidant gas, while producing water. This leads to a phenomenon of a higher oxygen partial pressure and a lower steam partial pressure in the upper stream of the gas flow path and a lower oxygen partial pressure and a higher steam partial pressure in the lower stream of the gas flow path.

The temperature of cooling water used for cooling down the cell is lower in the vicinity of the inlet and the higher in the vicinity of the outlet and there is accordingly a temperature distribution in a single cell plane. Because of the above reasons, there is a current density distribution (performance distribution) in a single cell plane.

When the uniform hydrogen partial pressure and steam partial pressure in the fuel gas, the uniform oxygen partial pressure and steam partial pressure in the oxidant gas, and the temperature distribution in a single cell plane are extremely enhanced and deviated from the optimum conditions, there is an extremely dried state (overdried state) or extremely wet state (overflooding state). Both the overdried state and the overflooding state may be observed in a single cell plane. This causes not only the current density distribution but malfunction of the cell.

In the cell stack including a large number of single cells, when the above problem arises in part of the many single cells in the cell stack, the deteriorating single cells interfere with the smooth operation of the whole cell stack. When a the single cell in the cell stack falls into the overflooding state, the pressure loss for the gas supply increases in the single cell. The gas supply manifold connects with the respective single cells in the cell stack and the overflooding state in one single cell accordingly interferes with a smooth flow of the gas and leads to the overflooding state in other single cells, and this undesirably accelerates the overflooding state.

When a single cell in the cell stack falls into the overdried state, on the other hand, the pressure loss for the gas supply decreases in the single cell. The overdried state in the single cells accordingly facilitates the gas flow and this undesirably accelerates the overdried state.

Such problems may be ascribed to the higher steam partial pressure in the gas in the vicinity of the gas outlet than that in the vicinity of the gas inlet both on the anode that receives a supply of the fuel gas and on the cathode that receives a supply of the oxidant gas.

When the polymer electrolyte fuel cell is used as the power supply for an electric vehicle, the requirements are the sufficient size reduction, weight reduction, and cost reduction as well as the high response under the high output conditions, that is, the high current-voltage characteristic in the high current density range. It is accordingly desirable to avoid the overflooding state or the overdried state discussed above.

The electrodes (the anode and the cathode) in the polymer electrolyte fuel cell generally have catalyst layers formed on both faces of the polymer electrolyte membrane and gas diffusion layers formed on the outside surfaces of the catalyst layers. The gas diffusion layers mainly have the three functions discussed below.

The first function is diffusion of the gas to allow a uniform supply of the fuel gas or the oxidant gas from the flow path located on the outside surface of the gas diffusion layer to the catalyst in the catalyst layer. The second function is quick discharge of water produced in the catalyst layer to the gas flow path. The third function is transmission of electrons required for the reaction or produced through the reaction.

The gas diffusion layer accordingly requires the high reaction gas permeability, steam permeability, and electron conductivity. The prior art technique adopts the gas diffusion layer of the porous structure for the enhanced gas permeability, dispersion of a water-repellent polymer such as a fluorocarbon resin in the gas diffusion layer for the enhanced steam permeability, and the gas diffusion layer composed of an electron conductive material such as carbon fibers, metal fibers, or carbon powder for the enhanced electron conductivity.

The above techniques for the enhanced gas permeability, steam permeability, and electron conductivity, however, exert the conflicting effects. For example, the raised porosity of the gas diffusion layer by reducing the diameter of carbon fibers or decreasing the quantity of carbon fibers for the enhanced gas permeability results in lowering the electron conductivity. Addition of the water-repellent polymer for the enhanced steam permeability results in lowering the gas permeability and the electron conductivity. Some proposed method does not use the gas diffusion layer composed of a single material but, for example, combines a layer of carbon fibers with another layer of carbon powder and a water-repellent polymer to make the conflicting functions compatible with one another. There has been, however, no proposed technique that specifies and proves the diverse characteristics of the carbon powder required for the gas diffusion layer.

The electrode including carbon powder with a noble metal catalyst carried thereon and a conductive porous base material of the gas diffusion layer is typically obtained by mixing carbon powder with a noble metal carried thereon and an organic solvent, such as isopropyl alcohol to obtain an ink and applying this ink onto the base material by screen printing or transfer method. Another process prepares a slurry including catalyst powder and applies the slurry on a resin sheet by the doctor blade method.

It is sometimes proposed to admix carbon powder with polytetrafluoroethylene (PTFE) carried thereon into the ink to enhance the water repellency of the electrode.

In order to prevent deterioration of the characteristic due to the current distribution in the electrode plane, the effective measure is to vary the water repellency of the electrode either in the plane direction of the electrode or in the direction of gas diffusion (thickness). Especially in the vicinity of the outlet of the gas flow path in the electrode, the pressure of the supplied gas tends to be lower than the pressure in the vicinity of the inlet to decrease a relative humidity and cause the dry state, and it is accordingly desirable to heighten the water holding property of the MEA from the inlet to the outlet.

The prior art screen printing or doctor blade method, however, does not allow a variation in composition of the electrode in the plane direction and requires multiple coating even in the direction of thickness, which undesirably complicates the manufacturing process.

In order to solve the problems of the prior art discussed above, an object of the present invention is, in first, to provide an improved polymer electrolyte fuel cell having a high discharge characteristic or more specifically a high current-voltage characteristic in a high current density range by varying the degree of water repellency of an anode and a cathode according to the position. Another object of the present invention is, in second, to provide an improved polymer electrolyte fuel cell having a high discharge characteristic by optimizing water repellency, a specific surface area, a primary particle diameter, and a DBP absorption of carbon powder in an anode and a cathode.

DISCLOSURE OF INVENTION

The present invention is directed to a polymer electrolyte fuel cell comprising a single cell having a cathode and an anode that are arranged across a hydrogen ion-conductive polymer electrolyte membrane, and a pair of conductive separator plates that are disposed outside the anode and the cathode and have gas flow paths for supplying and discharging a fuel gas and an oxidant gas to and from the anode and the cathode respectively, wherein each of the cathode and the anode comprises catalyst particles, a hydrogen ion-conductive polymer electrolyte, a conductive porous base material, and a water repellent agent, and a water repellency of at least one of the cathode and the anode varies in a direction of thickness or in a plane direction.

It is preferable that the water repellency varies continuously, i.e., the degree of the water repellency is gradient.

In this application, it is effective that the water repellency of the conductive porous base material varies in the direction of thickness and is higher on a side of the conductive separator plate than on a side of the hydrogen ion-conductive polymer electrolyte membrane.

It is also effective that the water repellency of the conductive porous base material varies in the plane direction and is higher on a gas outlet side of the separator than on a gas inlet side of the separator.

The present invention is also directed to another polymer electrolyte fuel cell comprising a single cell having a cathode and an anode that are arranged across a hydrogen ion-conductive polymer electrolyte membrane, and a pair of conductive separator plates that are disposed outside the anode and the cathode and have gas flow paths for supplying a fuel gas and an oxidant gas to the anode and the cathode, respectively, wherein each of the cathode and the anode comprises catalyst particles, a hydrogen ion-conductive polymer electrolyte, a conductive porous base material, and a water repellent agent, and a water repellency of the cathode is higher than a water repellency of the anode.

In this application, it is effective that a gas permeability of the conductive porous base material is 1 to 60 second/100 ml as a Gurley constant.

It is also effective that a gas permeability of the conductive porous base material in the cathode is 1.2 to 2.0 times a gas permeability of the conductive porous base material in the anode.

It is effective that a porosity of the conductive porous base material in the cathode is 1.2 to 2.0 times a porosity of the conductive porous base material in the anode.

It is further effective that a thickness of the conductive porous base material in the cathode is 1.2 to 3.0 times a thickness of the conductive porous base material in the anode.

In the polymer electrolyte fuel cell discussed above, it is effective that each of the cathode and the anode comprises a catalyst layer that is joined with the hydrogen ion-conductive polymer electrolyte membrane, and a gas diffusion layer that is in contact with the conductive separator plate, the catalyst layer is mainly composed of catalyst particles carried on carbon particles and a hydrogen ion-conductive polymer electrolyte, the gas diffusion layer is mainly composed of a conductive porous base material containing carbon particles, and a water repellency of the carbon particles included in the gas diffusion layer is higher than water repellency of the carbon particles included in the catalyst layer, and the water repellency of at least one of the cathode and the anode varies in the direction of thickness.

In this embodiment, it is effective that the carbon particles included in the gas diffusion layer is disposed at a joint between the catalyst layer and the conductive porous base material.

It is also effective that a specific surface area of the carbon particles included in the gas diffusion layer is not greater than ½ a specific surface area of the carbon particles included in the catalyst layer.

It is effective that a primary particle diameter of the carbon particles included in the gas diffusion layer is not less than 1.3 times a primary particle diameter of the carbon particles included in the catalyst layer.

It is further effective that a DBP absorption of the carbon particles included in the gas diffusion layer is not greater than ⅔ a DBP absorption of the carbon particles included in the catalyst layer.

BRIEF DESCRIPTION OF DRAWINGS

FIG. 15 is a graph showing discharge characteristics of fuel cells manufactured in Examples and Comparative Examples of the present invention.

BEST MODE FOR CARRYING OUT THE INVENTION

Figure 1:
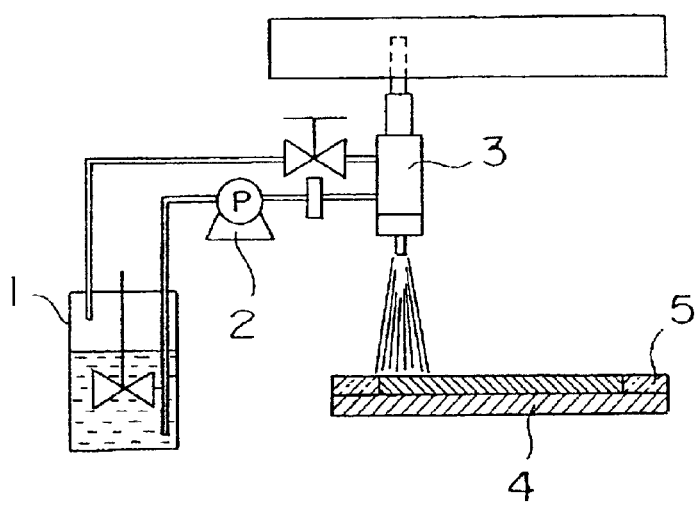
FIG. 1 illustrates the structure of a coating device used for spray coating a conductive porous base material.

The present invention provides a polymer electrolyte fuel cell in which distributions of water repellency of anodes and cathodes are regulated, so as to smooth the flows of gas and water content inside the fuel cell and thereby prevent easy deterioration of the cell performances. Thus, the present invention is attained by a diversity of applications.

The present invention is directed to a polymer electrolyte fuel cell comprising a single cell having a cathode and an anode that are arranged across a hydrogen ion-conductive polymer electrolyte membrane, and a pair of conductive separator plates that are disposed outside the anode and the cathode and have gas flow paths for supplying a fuel gas and an oxidant gas to the anode and the cathode, wherein each of the cathode and the anode comprises a particulate catalyst, a hydrogen ion-conductive polymer electrolyte, a conductive porous base material and a water repellent agent, and water repellency of at least one of the cathode and the anode varies in a direction of thickness or in a plane direction.

The polymer electrolyte fuel cell of the present invention namely has a hydrogen ion-conductive polymer electrolyte membrane, a pair of electrodes (anode and cathode) disposed across the membrane, and conductive separator plates with flow paths formed to feed supplies of gases to the respective electrodes.

Here the electrode may include a conductive porous base material forming a gas diffusion layer and a porous catalyst layer formed between the conductive porous base material and the hydrogen ion-conductive polymer electrolyte membrane and, further, the electrode may have a conductive fine particle (for example, carbon powder) layer between the conductive porous base material and the catalyst layer.

In the present invention, it is preferable that water repellency of at least one of the catalyst layer, the conductive porous base material and the conductive fine particle layer of the electrode varies in a plane direction. With a continuous increase in water repellency along a path leading from an inlet to an outlet of a gas flow path in an adjoining conductive separator plate, water retaining capacity in the MEA gradually rises from the inlet to the outlet of the gas flow path and this relieves the dried state in the vicinity of the outlet of the gas flow path due to a drop of gas pressure. And the distribution of water content becomes uniform in the electrode plane, thus improving the performances of the electrode.

Namely it is effective that the water repellency of the conductive porous base material continuously varies in the plane direction, and that the water repellency on a gas inlet side of the separator plate is higher than that on a gas outlet side. This arrangement effectively prevents evaporation of water content in the electrode in the vicinity of the gas outlet, thus depressing an increase in internal resistance.

In the present invention, it is preferable that the water repellency of the catalyst layer, the conductive fine particle layer, or the conductive porous base material is continuously increased in the direction of thickness, especially in the direction from the ion conductive polymer electrolyte membrane to the conductive porous base material (that is, in the direction reverse to the gas diffusion direction). This arrangement heightens the capacity of retaining water produced through the electrode reactions inside the MEA.

In other words, it is accordingly effective that the water repellency of the conductive porous base material continuously varies in the direction of thickness and is higher on a side of the conductive separator plate than on a side of the hydrogen ion-conductive polymer electrolyte membrane.

In the fuel cell of the present invention, it is effective that each of the cathode and the anode comprises a catalyst layer that is joined with the hydrogen ion-conductive polymer electrolyte membrane, and a gas diffusion layer that is in contact with the conductive separator plate, the catalyst layer is mainly composed of the particulate catalyst carried on particulate carbon and the hydrogen ion-conductive polymer electrolyte, the gas diffusion layer is mainly composed of the conductive porous base material containing particulate carbon, the water repellency of the particulate carbon included in the gas diffusion layer is higher than water repellency of the particulate carbon included in the catalyst layer, and the water repellency of at least one of the cathode and the anode varies in the direction of thickness. For example, it is preferable that the water repellency of particulate carbon included in the gas diffusion layer is higher than the water repellency of particulate carbon included in the catalyst layer. This arrangement thus advantageously ensures homogeneous supply of a reaction gas to the catalyst in the catalyst layer and quick discharge of product water in the polymer electrolyte fuel cell of the present invention.

The water repellency varying with a gradient in the direction along the gas flow path or in the direction reverse to the gas diffusion direction (in the plane direction or in the direction of thickness) is attained by a process of spraying a water repellent dispersion alone or together with catalyst particles or conductive fine particles from a spray nozzle, which can scan two-dimensionally at an arbitrary rate, onto any surface to be applied (surface to be coated) among the hydrogen ion-conductive polymer electrolyte membrane, the catalyst layer, the conductive fine particle layer, and the conductive porous base material.

The above-mentioned process enables a solvent to be mostly evaporated prior to the adhesion of the dispersion onto the surface to be applied, and thus effectively prevents the surface to be applied from being swelled with the solvent.

The spray nozzle can scan two-dimensionally at an arbitrary rate and, thus, the process can continuously heighten or lower the scanning rate and makes the spray nozzle scan along the gas flow path from the inlet to the outlet or from the outlet to the inlet, while spraying the water repellent agent-containing dispersion onto the porous catalyst layer, the conductive porous base material, or the conductive fine particle layer. At this time, the lower scanning rate of the spray nozzle increases the quantity of the water repellent agent applied per unit area by spray coating.

A spray nozzle for spraying a dispersion of catalyst particles or conductive fine particles and a spray nozzle for spraying a dispersion of a water repellent agent are disposed close to each other and are scanned simultaneously at a constant rate along the gas flow path from the inlet to the outlet or from the outlet to the inlet. At this time, the process sprays the dispersions simultaneously from the two spray nozzles onto the polymer electrolyte membrane or the conductive porous base material while keeping a fixed spraying rate of the dispersion of catalyst particles or conductive fine particles and continuously increasing or decreasing only the spraying rate of the dispersion of the water repellent agent and, thereby, the scanned part at the higher spraying rate of the water repellent agent results in the greater quantity of the water repellent agent applied per unit area by spray coating.

In another application, the process feeds the dispersion of catalyst particles or conductive fine particles and the dispersion of the water repellent agent to a mixing vessel, successively feeds the dispersion mixture to a spray nozzle, and sprays the dispersion mixture while scanning the spray nozzle along the gas flow path from the inlet to the outlet or from the outlet to the inlet. In this application, when the content of the water repellent agent contained in the dispersion mixture is varied with the lapse of time, the scanned part with the greater content of the water repellent agent results in the greater quantity of the water repellent agent applied per unit area by spray coating.

The above process readily gives the catalyst layer, the conductive porous base material or the conductive fine particle layer having the water repellency, which is gradient along the gas flow path.

In still another application, the process feeds the dispersion of catalyst particles or conductive fine particles and the dispersion of the water repellent agent to a mixing vessel, successively feeds the dispersion mixture to a spray nozzle, and sprays the dispersion mixture from the spray nozzle at a fixed position onto the polymer electrolyte membrane or the conductive porous base material. If the content of the water repellent agent contained in the dispersion mixture is varied with the lapse of time, the catalyst layer or the conductive fine particle layer having the water repellency, which is gradient in the gas diffusion direction (in the direction of thickness), can be given. Multiple coating of the dispersion mixture with a variation in content of the water repellent agent gives the equivalent catalyst layer or conductive fine particle layer.

The conditions of spraying the respective dispersions are selected adequately according to the type of the solvent and the type of the water repellent agent. Especially preferable conditions are the nozzle opening diameter of 0.5 to 2 mm, the atomization pressure (the jet pressure from the nozzle) of 0.5 to 3 kgf/cm$^2$, and the nozzle height (the distance between the nozzle and the surface to be applied) of 5 to 30 cm. The preferable mean particle diameter of the fine particles included in the sprayed dispersion ranges from 0.1 to 20 $\mu$m.

The preferable content of the solid matter in each dispersion is 5 to 20% by weight, and the preferable viscosity is not higher than 50 P.

A perfluorocarbon sulfonate membrane, such as a Nafion membrane manufactured by Du Pont, or a hydrocarbon membrane manufactured by Hochst Corporation is preferably applicable for the hydrogen ion-conductive polymer electrolyte membrane. Carbon paper, carbon cloth, or a carbon-PTFE composite sheet (sheet of kneaded carbon and PTFE) is preferably used for the conductive porous base material. A fluorocarbon resin like PTFE is preferably used for the water repellent agent.

Carbon powder having the mean particle diameter of 100 to 1000 nm and carrying a noble metal thereon is preferably used for the particulate catalyst. The dispersion of the particulate catalyst may further include a polymer electrolyte, carbon powder water-repellent treated with a fluorocarbon resin, and a water repellent agent.

The conductive fine particle layer is preferably composed of a carbon material having the mean particle diameter of 0.1 to 10 $\mu$m, a metal material, a carbon-polymer composite material, or a metal-polymer composite material. Carbon powder with a fluorocarbon resin adhered thereon is especially preferable as the carbon-polymer composite material. The dispersion of the conductive fine particles may further include a polymer electrolyte, and a water repellent agent and the like.

Preferable examples of the solvent include ethanol, isopropyl alcohol, butanol, ethoxyethanol, pentyl alcohol, butyl acetate, and water. Any of these compounds may be used alone or in combination. Especially preferable are ethanol, butanol, and butyl acetate, because of the easy vaporization by spraying.

Any of conventionally used separator plates may be applicable without any restriction for the conductive separator plate of the present invention, which has the flow paths formed thereon for supplying gases to the respective electrodes. There is no specific limitation with regard to the shape of the polymer electrolyte fuel cell including a single cell obtained by laminating the electrodes and the separator plates.

The following structure is preferably applicable in the polymer electrolyte fuel cell including the single cell, which has a cathode and an anode that are arranged across a hydrogen ion-conductive polymer electrolyte membrane, and a pair of conductive separator plates that are disposed outside the anode and the cathode and have gas flow paths in which supplies of a fuel gas and an oxidant gas to the anode and the cathode are flown.

It is accordingly effective that each of the cathode and the anode has a catalyst layer that is joined with the hydrogen ion-conductive polymer electrolyte membrane and a gas diffusion layer that is in contact with the conductive separator plate, the catalyst layer is mainly composed of the particulate catalyst carried on particulate carbon and the hydrogen ion-conductive polymer electrolyte, the gas diffusion layer is mainly composed of the conductive porous base material containing particulate carbon, and the water repellency of the particulate carbon included in the gas diffusion layer of the cathode is higher than the water repellency of the particulate carbon included in the gas diffusion layer of the anode. This arrangement advantageously prevents flooding of the gas diffusion layer due to water produced in the cathode and seals an adequate quantity of water content by means of the water repellency of the gas diffusion layer, thus enhancing the water retaining effect of the catalyst layer in the cathode.

It is preferable that the gas diffusion layer is composed of the conductive porous base material with the carbon particles dispersed therein.

In the polymer electrolyte fuel cell of the present invention, it is effective that the gas permeability of the conductive porous base material is 1 to 60 seconds/100 ml as the Gurley constant. Adequate compactness of the conductive porous base material forming the gas diffusion layer assures compatibility of the conductivity of the electrode with the gas diffusion ability. This actualizes the polymer electrolyte fuel cell having a small voltage drop under the condition of a large driving current.

It is also effective that the gas permeability of the conductive porous base material in the cathode is 1.2 to 2.0 times the gas permeability of the conductive porous base material in the anode. This arrangement advantageously ensures a sufficient supply of the oxidant gas to the catalyst layer, relative to the supply of the fuel gas, even when the air having a lower oxygen concentration is used as the oxidant gas. The gas permeability of less than 1.2 leads to a voltage drop due to an insufficient supply of oxygen in the range of high current density, and the high gas permeability of greater than 2.0, on the other hand, excessively heightens the porosity and disadvantageously lowers the strength of the electrode and the conductivity.

It is effective that the porosity of the conductive porous base material in the cathode is 1.2 to 2.0 times the porosity of the conductive porous base material in the anode. This exerts the similar effects to those of the gas permeability.

It is further effective that the thickness of the conductive porous base material in the cathode is 1.2 to 3.0 times the thickness of the conductive porous base material in the anode. This structure advantageously ensures the layer of sufficient thickness for regulating the water repellency and the water retaining capacity. The thickness out of the above range disadvantageously lowers the gas permeability, the conductivity, and the water repellency.

It is preferable that the carbon particles included in the gas diffusion layer is located at the joint of the catalyst layer and the conductive porous base material. For example, formation of a mixed layer of carbon powder included in the gas diffusion layer and carbon powder included in the catalyst layer at the interface between the catalyst layer and the gas diffusion layer increases the joint area of the catalyst layer and the gas diffusion layer. This arrangement effectively ensures efficient and quick transfer of the reaction gas, product water, and electrons and thereby improves the cell performances.

It is effective that the specific surface area of the carbon particle included in the gas diffusion layer is not greater than ½ the specific surface area of the carbon particle included in the catalyst layer. Carbon powder having a smaller specific surface area has a lower water absorbing capacity and a higher water repellency than carbon powder having a larger specific surface area. The setting of the specific surface area of carbon powder in the gas diffusion layer not greater than ½ the specific surface area of carbon powder in the catalyst layer makes the water repellency of carbon powder in the gas diffusion layer higher than that in the catalyst layer.

It is preferable that the specific surface area of carbon powder used for the gas diffusion layer in the cathode is not greater than ½ the specific surface area of carbon powder used for the gas diffusion layer in the anode. This arrangement ensures quick discharge of product water and thereby improves the gas diffusion ability in the cathode.

It is also effective that the primary particle diameter of the carbon particle included in the gas diffusion layer is not less than 1.3 times the primary particle diameter of the carbon particle included in the catalyst layer. The smaller primary particle diameter of carbon powder results in the greater specific surface area and the lower water repellency. The setting of the particle diameter of the carbon particle in the gas diffusion layer greater by at least 30% than the particle diameter of the carbon particle in the catalyst layer effectively heightens the water repellency of the gas diffusion layer compared with the water repellency of the catalyst layer.

The setting of the primary particle diameter of the carbon particle used for the gas diffusion layer in the cathode greater by at least 30% than the primary particle diameter of the carbon particle used for the gas diffusion layer in the anode ensures quick discharge of the product water and thereby improves the gas diffusion ability in the cathode.

It is effective that the DBP absorption of the carbon particles included in the gas diffusion layer is not greater than ⅔ the DBP absorption of the carbon particles included in the catalyst layer. The carbon particles having the greater DBP absorption defined by the carbon black test for rubber (JIS K6221) has the highly developed structure and the higher porosity. The carbon particles of the highly developed structure have the greater specific surface area, which facilitates adsorption of the water content and gives the higher wetting ability. Namely the setting of the DBP absorption of the carbon particles in the gas diffusion layer not greater than ⅔ the DBP absorption of the carbon particles in the catalyst layer raises the water repellency of the gas diffusion layer and improves the gas diffusion ability.

The setting of the DBP absorption of the carbon particles used for the gas diffusion layer in the cathode not greater than ⅔ the DBP absorption of the carbon particles used for the gas diffusion layer in the anode heightens the water repellency of the gas diffusion layer and enhances the gas diffusion ability.

The following describes some Examples of the present invention, although the present invention is not restricted to these Examples in any sense.

EXAMPLE 1

A gas diffusion layer having water repellency gradient along a gas flow path direction was produced from carbon paper having a thickness of 360 $\mu$m (manufactured by Toray Industries, Inc.) as the conductive porous base material with a spray coating device shown in FIG. 1.

A dispersion of polytetrafluoroethylene (ND-1 manufactured by Daikin Industries LTD.) was charged into a vessel 1 of FIG. 1 and continuously stirred with a stirring blade. The dispersion in the vessel 1 was pressed into a spray nozzle 3 by means of a pump 2. The solution not sprayed from the spray nozzle 3 was circulated to and collected in the vessel 1. The spray nozzle 3 could be two-dimensionally scanned at an arbitrary rate by means of two actuators.

A mask frame 5 cut into a size of 60 mm×60 mm was located on carbon paper 4, and the dispersion was sprayed from the spray nozzle 3 while the spray nozzle 3 was moved. The spray nozzle 3 was moved to have a continuous increase in scanning rate from an outlet to an inlet of the gas flow path in the assembled single cell.

The carbon paper was cut along the gas flow path to sample a small piece, and the weight was measured. To find that the amount of fluorocarbon resin added to the carbon paper continuously increased in the range of 0 to 50% by weight from the inlet to the outlet of the gas flow path.

The water-repellent treated carbon paper (gas diffusion layer) was then baked for removal of the remaining solvent, surfactant and the like. Then, a dispersion of carbon particles was screen printed on the gas diffusion layer to form a catalyst layer, giving an electrode. A screen of 100 mesh was used here.

The dispersion of catalyst particles was prepared by mixing 20 g of carbon powder with 25% by weight of platinum carried thereon (mean particle diameter: 100 to 500 nm), 225 g of a dispersion of perfluorocarbon sulfonate (Nafion solution manufactured by Aldrich Corporation, the USA, solid matter: 5% by weight), 250 g of butanol as the solvent, and several drops of a commercially available surfactant (NP-10 manufactured by Nihon Surfactant Kogyo Kabushiki Kaisya) with a ball mill method.

After the screen printing, the electrode was sufficiently dried at 80° C. for removal of the solvent, and a single cell was obtained by disposing a pair of electrodes across a polymer electrolyte membrane (Nafion 112 manufactured by Du Pont, the USA). This single cell was set in a current-voltage characteristic measurement device, and a supply of hydrogen gas was flown to the anode (fuel electrode), whereas a supply of the air was flown to the cathode (air electrode). Under the settings of the cell temperature of 80° C., the fuel utilization of 90%, and the air utilization of 30%, humidity was added to make the dew points of the hydrogen gas and the air respectively equal to 75° C. and 65° C. The current-voltage characteristic of the resulting cell is shown in FIG. 2.

COMPARATIVE EXAMPLES 1 to 3

A water-repellent treatment of a carbon paper was conducted by dipping the carbon paper in the ND-1 dispersion described above and heating the same to make the amount of fluorocarbon resin added to the plane of the carbon paper uniform. Gas diffusion layers having 0% by weight (no treatment), 25% by weight, and 50% by weight of the fluorocarbon resin added to the carbon paper were obtained by regulating the degree of dilution of the ND-1 dispersion. The sample procedures were conducted as in Example 1 except that these three gas diffusion layers. The current-voltage characteristics of the resulting cells are shown in FIG. 2.

Figure 2:
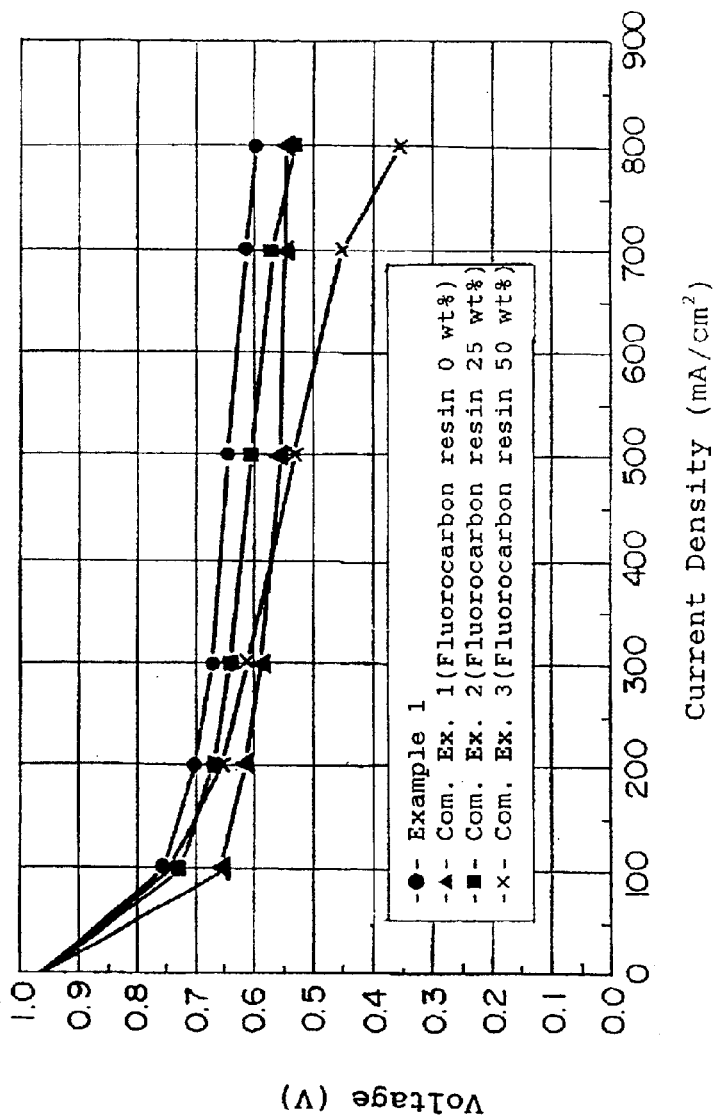
FIG. 2 is a graph showing current-voltage characteristics of single cells obtained in Examples and Comparative Examples of the present invention.

As clearly shown in FIG. 2, the cell of Example 1, in which the amount of fluorocarbon resin added to the plane of the carbon paper continuously increases from the inlet to the outlet of the gas flow path, has the better characteristic than any of the cells of Comparative Examples 1 to 3 having the uniform amounts of fluorocarbon resin in the respective planes of the carbon paper. This proves that not only a variation in total amount of fluorocarbon resin added but a continuous gradient of the amount of fluorocarbon resin added to the plane of the carbon paper is effective for the improved characteristic of the cell. The amount of fluorocarbon resin added to the plane of the carbon paper was varied in the range of 0 to 50% by weight. In the case of a variation in amount of addition according to the working conditions of the cell, however, the similar effects were observed as long as the amount of fluorocarbon resin was continuously increased from the inlet to the outlet of the gas flow path.

EXAMPLE 2

Figure 3:
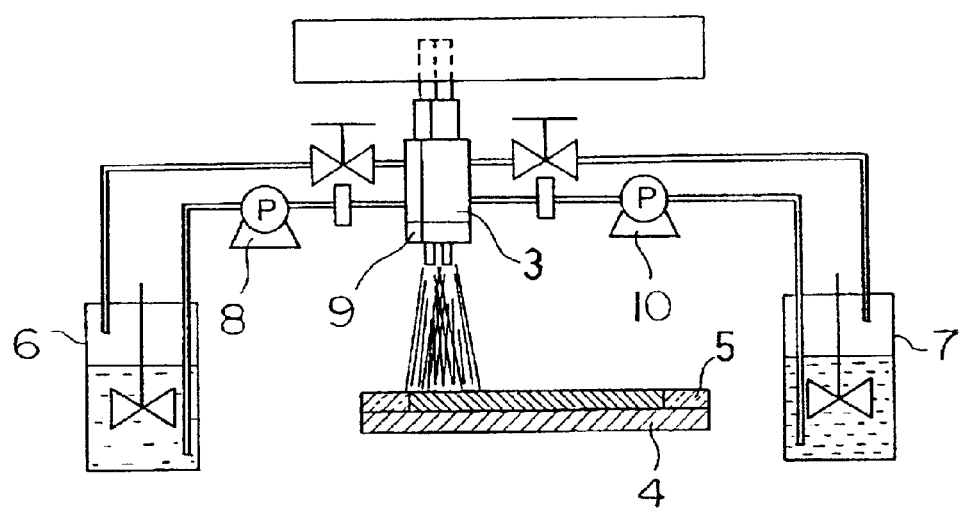
FIG. 3 illustrates the structure of another coating device used for spray coating the conductive porous base material.

The ND-1 dispersion, a dispersion of conductive fine particles (including 100 g of Denka Black manufactured by DENKI KAGAKU KOGYO KABUSHIKI KAISYA, 900 g of water, and 2 g of a surfactant Triton X-100), and carbon paper were set in a spray coating device shown in FIG. 3, and a carbon layer as the conductive fine particle layer was produced on the carbon paper constituting the gas diffusion layer.

The ND-1 dispersion charged in a vessel 6 and the carbon dispersion charged in a vessel 7 were continuously stirred with a stirring blade, respectively. The ND-1 dispersion in the vessel 6 was pressed into a spray nozzle 9 by means of a pump 8, while the carbon dispersion in the vessel 7 was pressed into a spray nozzle 3 by means of a pump 10. Non-used remaining ND-1 dispersion and carbon dispersion were circulated and collected in the corresponding vessels. The spray nozzles 3 and 9 were disposed to be close to each other, and each nozzle was scanned two-dimensionally at an arbitrary rate by means of two actuators.

A mask frame 5 cut into a size of 60 mm×60 mm was located on carbon paper 4. While the spray nozzles 3 and 9 were moved, the ND-1 dispersion and the carbon dispersion were sprayed (atomized). The spray nozzle 9 was moved at a constant rate to have a continuous increase in amount of spray from an inlet to an outlet of the gas flow path in the assembled single cell, whereas the spray nozzle 3 was moved at a constant rate to have a constant amount of spray. The amount of spray was adjusted to make the amount of carbon added onto the carbon paper continuously increase in the range of 1.5 to 2.5 mg/cm$^2$ and the rate of the amount of fluorocarbon resin to the amount of carbon continuously increase in the range of 0.25 to 1.0 (ratio by weight) from the inlet to the outlet of the gas flow path.

The gas diffusion layer was heated to 350 to 380° C. for removal of the remaining solvent and surfactant. The same procedures were conducted as in Example 1 except that this gas diffusion layer was used. The current-voltage characteristic of the resulting cell is shown in FIG. 4.

COMPARATIVE EXAMPLES 4 to 6

Dispersions having the rate of the amount of fluorocarbon resin to the amount of carbon equal to 0.25, 0.5, and 1.0 (ratio by weight) were prepared, and were uniformly sprayed onto carbon paper with the spray coating device used in Example 1 to attain the amount of carbon in the range of 1.5 to 2.5 mg/cm$^2$. The same procedures were conducted as in Example 1 except that the carbon papers (gas diffusion layers) with these three carbon layers formed thereon were used. The current-voltage characteristics of the resulting cells are also shown in FIG. 4.

Figure 4:
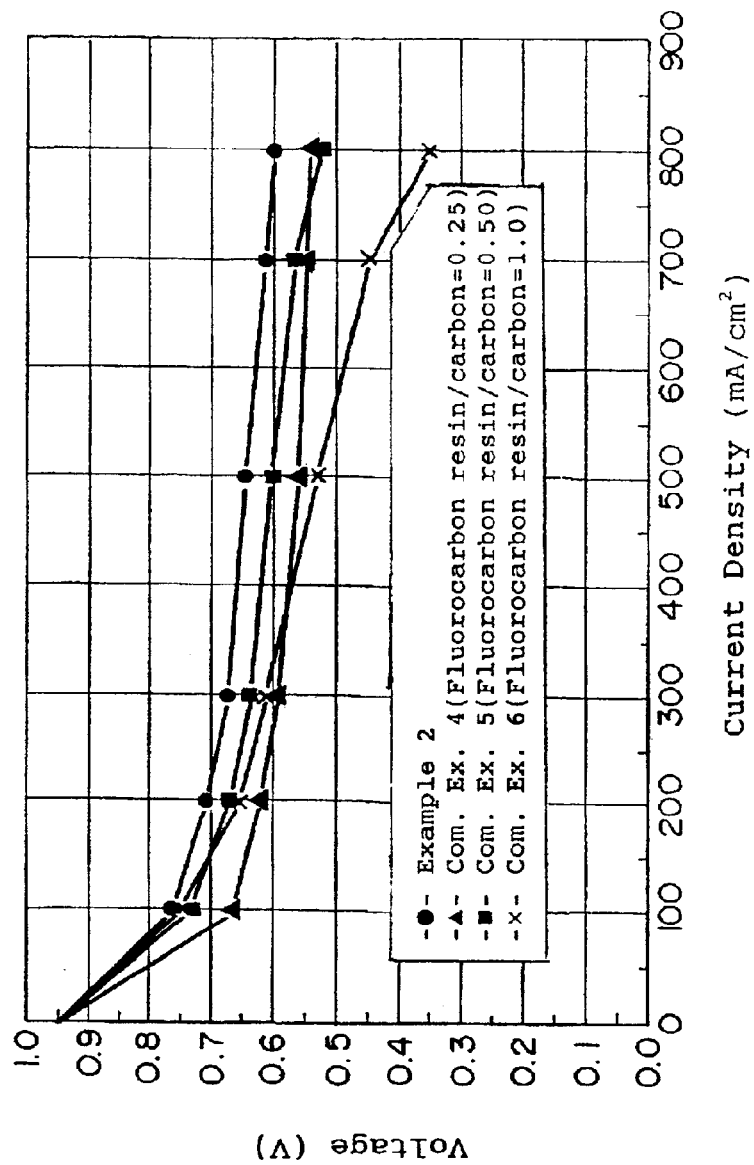
FIG. 4 is a graph showing current-voltage characteristics of single cells obtained in Examples and Comparative Examples of the present invention.

As clearly shown in FIG. 4, the cell having a continuous increase in amount of fluorocarbon resin added to the carbon layer from the inlet to the outlet of the gas flow path (Example 2) has the better characteristic than any of the three cells (Comparative Examples 4 to 6) having the uniform amounts of fluorocarbon resin added to the respective carbon layers. This proves that not only a variation in total amount of fluorocarbon resin added to the carbon layer but a continuous gradient of the amount of fluorocarbon resin added to the carbon layer from the inlet to the outlet of the gas flow path is effective for the improved characteristic of the cell.

Here the rate of the amount of fluorocarbon resin to the amount of carbon was continuously changed in the range of 0.25 to 1.0 (ratio by weight), but even when this rate was varied according to the working conditions of the cell, the similar effects were observed as long as the rate continuously increased from the inlet to the outlet of the gas flow path.

EXAMPLES 3 to 7

Figure 5:
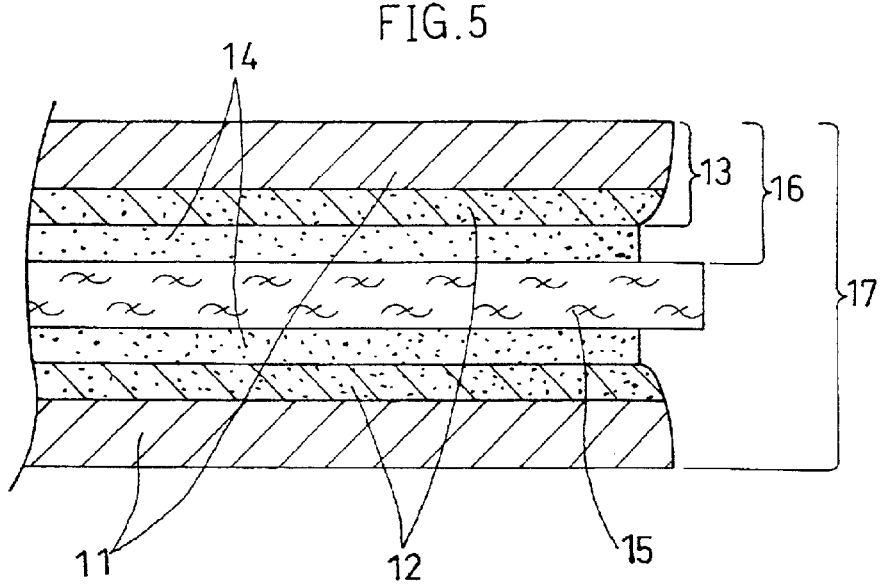
FIG. 5 is a vertical sectional view schematically illustrating an MEA manufactured in one Example of the present invention.

An MEA 17 having the structure shown in FIG. 5 was manufactured first in Example 3. A catalyst for electrode was prepared by making platinum particles having the mean particle diameter of approximately 30 Å carried on carbon powder (Vulcan XC72 manufactured by Cabot Corporation, the USA: primary particle diameter: 30 nm, specific surface area: 254 m$^2$/g, DBP absorption: 174 cc/100 g) at 25% by weight. An isopropyl alcohol dispersion solution of this catalyst powder was mixed with an ethyl alcohol dispersion of perfluorocarbon sulfonate powder expressed by Formula (1):

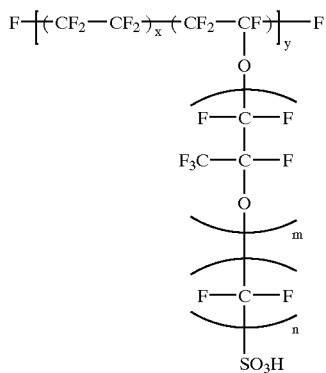

where 5≤X≤13.5, y≈1000, m=1 and n=2, to give a catalyst paste.

On the other hands, carbon paper as a conductive porous base material constituting the gas diffusion layer of the electrode was subjected to water-repellent treatment. Non-woven carbon fabric 11 having the thickness of 360 μm (TGP-H-120 manufactured by Toray Industries, Inc.) was impregnated with an aqueous dispersion (Neoflon ND-1 manufactured by Daikin Industries LTD.) of tetrafluoroethylene-hexafluoropropylene copolymer (FEP), dried, and was heated at 380° C. for 30 minutes to give water repellency.

Then, carbon powder (Acetylene Black HS-100 manufactured by DENKI KAGAKU KOGYO KABUSHIKI KAISYA, primary particle diameter: 53 nm, specific surface area: 37 m$^2$/g, DBP absorption: 200 cc/100 g) was dispersed in Neoflon ND-1 to obtain a paste having the mixing weight ratio of carbon powder to FEP equal to 87 to 13. This paste was applied on the surface of the water-repellent treated non-woven carbon fabric 11, dried, and heated at 380° C. for 30 minutes to form a carbon powder layer 12. At this time, a part of the carbon powder layer 12 was embedded in the non-woven carbon fabric 11. This completed a gas diffusion layer 13 including the non-woven carbon fabric 11 and the carbon powder layer 12.

The catalyst paste described above was applied on this carbon powder layer 12 by screen printing to form a catalyst layer 14. This gave an electrode 16 including the catalyst layer 14, the carbon powder layer 12, and the non-woven carbon fabric 11.

The amount of platinum contained in the electrode was 0.5 mg/cm$^2$, and the amount of perfluorocarbon sulfonate was 1.2 mg/cm$^2$. This electrode 16 was used for both the anode and the cathode.

The water repellency of the carbon powder (Acetylene Black HS-100 manufactured by DENKI KAGAKU KOGYO KABUSHIKI KAISYA) used for the gas diffusion layer was higher than the water repellency of carbon powder (Vulcan XC72) used for the catalyst layer. The water repellency was evaluated by the following procedure.

In first, carbon particles to be evaluated were applied flatly on the surface of glass with a doctor blade and a solution of a different surface tension (mN/m) was added dropwise onto the applied carbon particles. The procedure then observed whether the solution added dropwise soaked in through the applied surface or was repelled by the applied surface. The carbon particles that repel the solution of the smaller surface tension have the higher water repellency. For example, the surface tensions of water and ethanol are respectively equal to 72 and 22 (mN/m), and the water repellency of the carbon particles that repel both water and ethanol is higher than the water repellency of carbon particles that repel water but allow ethanol to be soaked in. The results of evaluation are shown in Table 1. Table 1 shows the physical properties of the respective carbon particles and the evaluation results of the water repellency. Each value written in the column 'Water Repellency' represents the smallest surface tension (mN/m) of the solution, which was repelled by carbon particles.

Then, a pair of the electrodes 16 were joined with a hydrogen ion-conductive polymer electrolyte membrane 15 (Nafion 112 manufactured by Du Pont, the USA) having a greater outer dimension by 5 mm than the electrode 16 by hot pressing such that the catalyst layers 14 were in contact with the electrolyte membrane 15 to give an MEA 17. A single cell was manufactured by interposing this MEA 17 between a pair of conductive separator plates. The conductive separator plate was obtained by cold press-forming a powdery carbon material to give a carbon plate and impregnating phenol resin in the carbon plate and curing. The impregnated resin improved the gas sealing property. The carbon plate was then cut to form gas flow paths.

Figure 6:
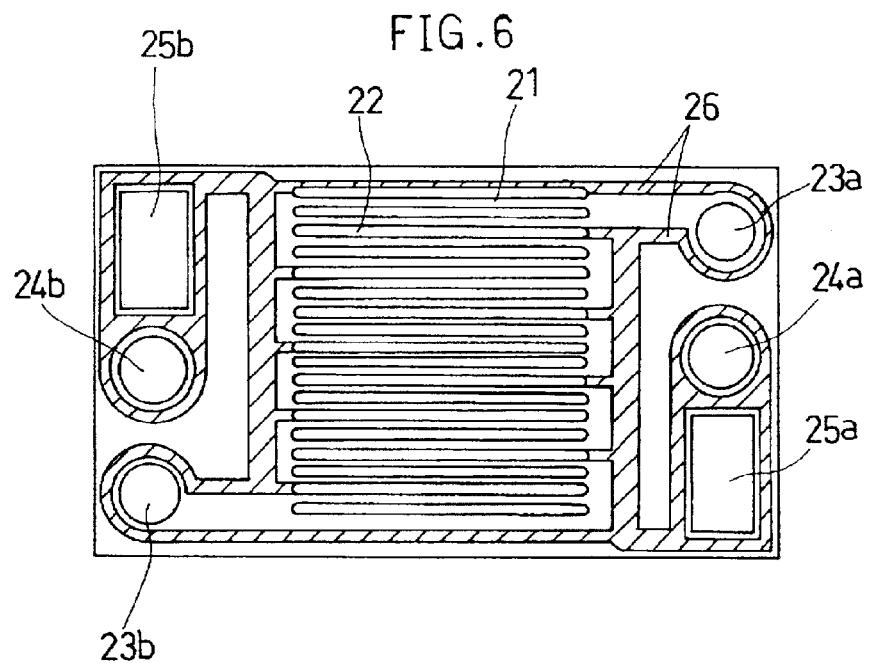
FIG. 6 is a plan view schematically illustrating a conductive separator plate with gas flow paths (grooves) formed on the surface thereof.
Figure 7:
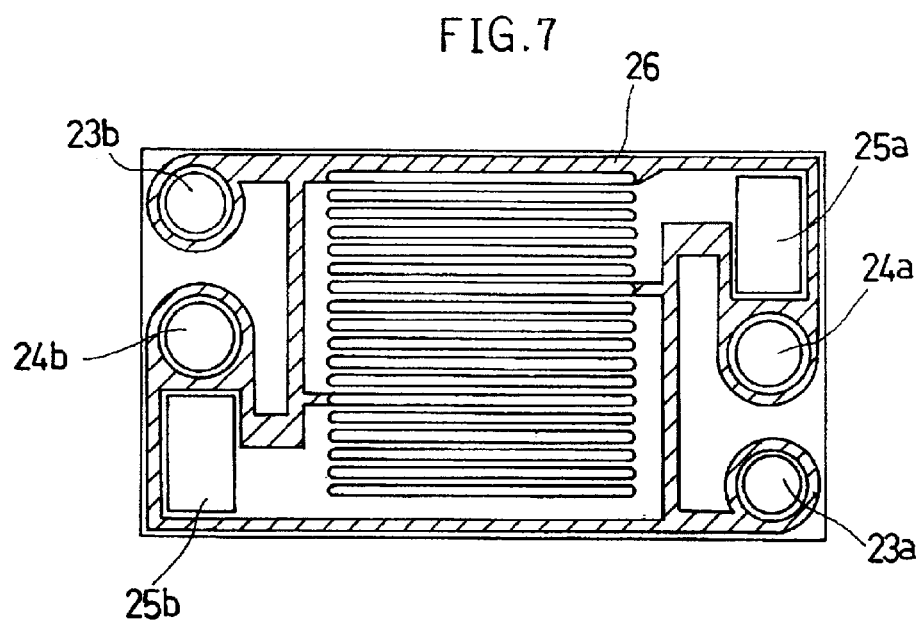
FIG. 7 is a plan view schematically illustrating another conductive separator plate with gas flow paths (grooves) formed on the surface thereof.

FIGS. 6 and 7 are plan views schematically illustrating conductive separator plates having gas flow paths (grooves) formed on the surfaces. FIG. 6 shows a shape of a gas flow path for a fuel gas formed on the surface of a conductive separator plate, and another gas flow path for an oxidant gas having the same configuration is formed on the rear surface of this conductive separator plate. FIG. 7 shows a shape of a flow path for cooling water, which is formed on the rear surface of another conductive separator plate with a gas flow path for the fuel gas. Each separator plate has the dimensions of 10 cm×20 cm×4 mm and a groove 21 forming the gas flow path is a recess of 2 mm in width and 1.5 mm in depth, through which the corresponding gas flows. A rib 22 between the gas flow paths is a convex portion of 1 mm in width. Manifold apertures of the oxidant gas (inlet 23a, outlet 23b), manifold apertures of the fuel gas (inlet 24a, outlet 24b), and manifold apertures of cooling water (inlet 25a, outlet 25b) were also formed in the separator plate. The separator plate further had a conductive gas seal element 26 in which conductive carbon was dispersed in polyisobutylene.

The MEA 17 shown in FIG. 5 was interposed between a pair of the conductive separator plates shown in FIG. 6 such that the gas flow path for the fuel gas in one separator plate and the gas flow path for the oxidant gas in the other separator plate faced the MBA 17 to give a single cell A. The MBA 17 shown in FIG. 5 was interposed between a pair of the conductive separator plates shown in FIG. 7 such that the gas flow path for the fuel gas in one separator plate and the flow path for cooling water in the other separator plate faced the MEA 17 to give a single cell B.

Then, a stack was produced by alternately laying the single cells A and the single cells B one upon another to include the total of 50 single cells. A pair of metal collector plates, a pair of insulator plates composed of an electrically insulating material, and a pair of end plates are arranged on both sides of the stack to obtain a stack. A cell module was obtained by claming the two end plates with bolts and nuts passing through the stack. The clamping pressure per unit area of the conductive separator plate was 10 kgf/cm$^2$. A clamping rod for clamping the stack was arranged on a side face, which was different from the side face with the gas inlet and outlet. The cell module thus obtained was used as a fuel cell 1 (Example 3).

Then, fuel cells having MEAs of different structures were also manufactured. Fuel cells 2 to 8 (Examples 4 to 7 and Comparative Examples 7 to 9) were obtained by using carbon particles different from Example 3 for the catalyst layer and the gas diffusion layer). The constituents other than the carbon powder were the same as those of Example 3. Kinds of carbon particles used and their physical properties are shown in Table 1. The carbon material numbers used for the cathode and the anode of each fuel cell, the cell structure, and the cell number are enumerated in Table 2. The particle diameter written in Table 1 represents the primary particle diameter.

TABLE 1

| Material | | Particle Diameter (nm) | DBP absorbing (ml/100 g) | Specific Surface Area | Water Repellency |
|---|---|---|---|---|---|
| 1 | BP3700 by CABOT | 53 | 111 | 38 | Not less than 72 |
| 2 | BP3700 by CABOT | 30 | 174 | 254 | Not less than 72 |
| 3 | HS-100 by DENKI KAGAKU KOGYO K. K. | 53 | 200 | 37 | 36 |
| 4 | Particle by DENKI KAGAKU KOGYO K. K. | 35 | 230 | 68 | 32 |
| 5 | #3030B by Mitsubishi chemical Corp. | 55 | 130 | 29 | 40 |
| 6 | #3030B by Mitsubishi chemical Corp. | 40 | 180 | 50 | 38 |
| 7 | EC600JD by AKZO | 30 | 495 | 1270 | Not less than 72 |
| 8 | EC by AKZO | 30 | 360 | 800 | Not less than 72 |

TABLE 2

| | | Cathode | | Anode | |
|---|---|---|---|---|---|
| | Cell | Catalyst layer | Gas diffusion layer | Catalyst layer | Gas diffusion layer |
| Ex. 3 | 1 | 2 | 3 | 2 | 3 |
| 4 | 2 | 2 | 4 | 2 | 3 |
| 5 | 3 | 2 | 5 | 2 | 5 |
| 6 | 4 | 7 | 5 | 7 | 5 |
| 7 | 5 | 8 | 6 | 8 | 6 |
| Com. Ex. 7 | 6 | 2 | 2 | 2 | 2 |
| 8 | 7 | 3 | 3 | 3 | 3 |
| 9 | 8 | 7 | 7 | 7 | 7 |

[Evaluation]

The fuel cells 1 to 8 obtained in Examples 3 to 7 and Comparative Examples 7 to 9 were subjected to a discharge characteristic test.

A supply of pure hydrogen gas and a supply of the air were respectively fed to the anode and the cathode of the fuel cell, and the cell temperature was kept at 75° C. The utilization (Uf) of the fuel gas was 70%, and the utilization (Uo) of the air was 20%. The fuel gas and the air were respectively humidified with a bubbler at 85° C. and 65 to 70° C.

Figure 8:
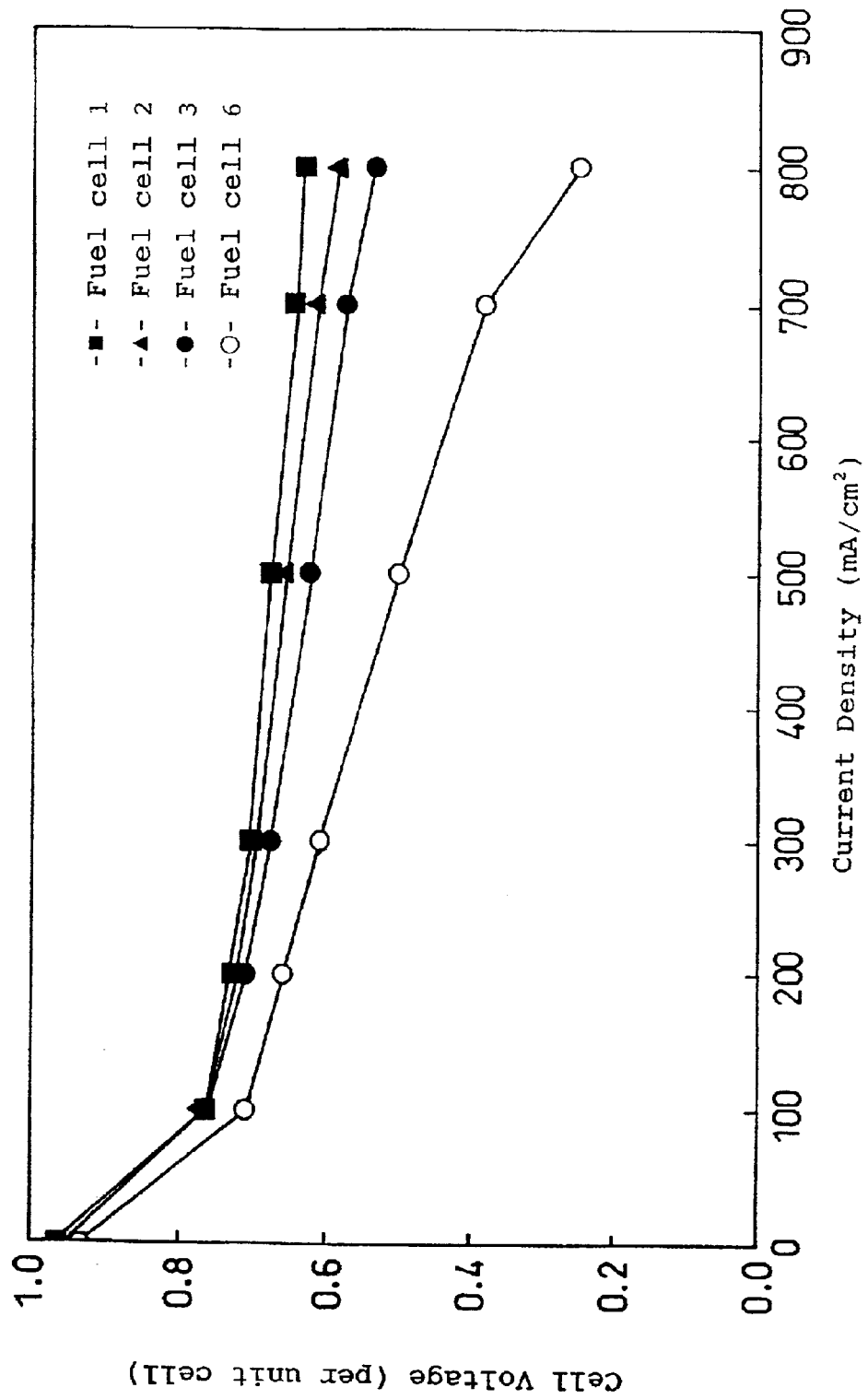
FIG. 8 a graph showing discharge characteristics of fuel cells manufactured in Examples and Comparative Examples of the present invention.
Figure 9:
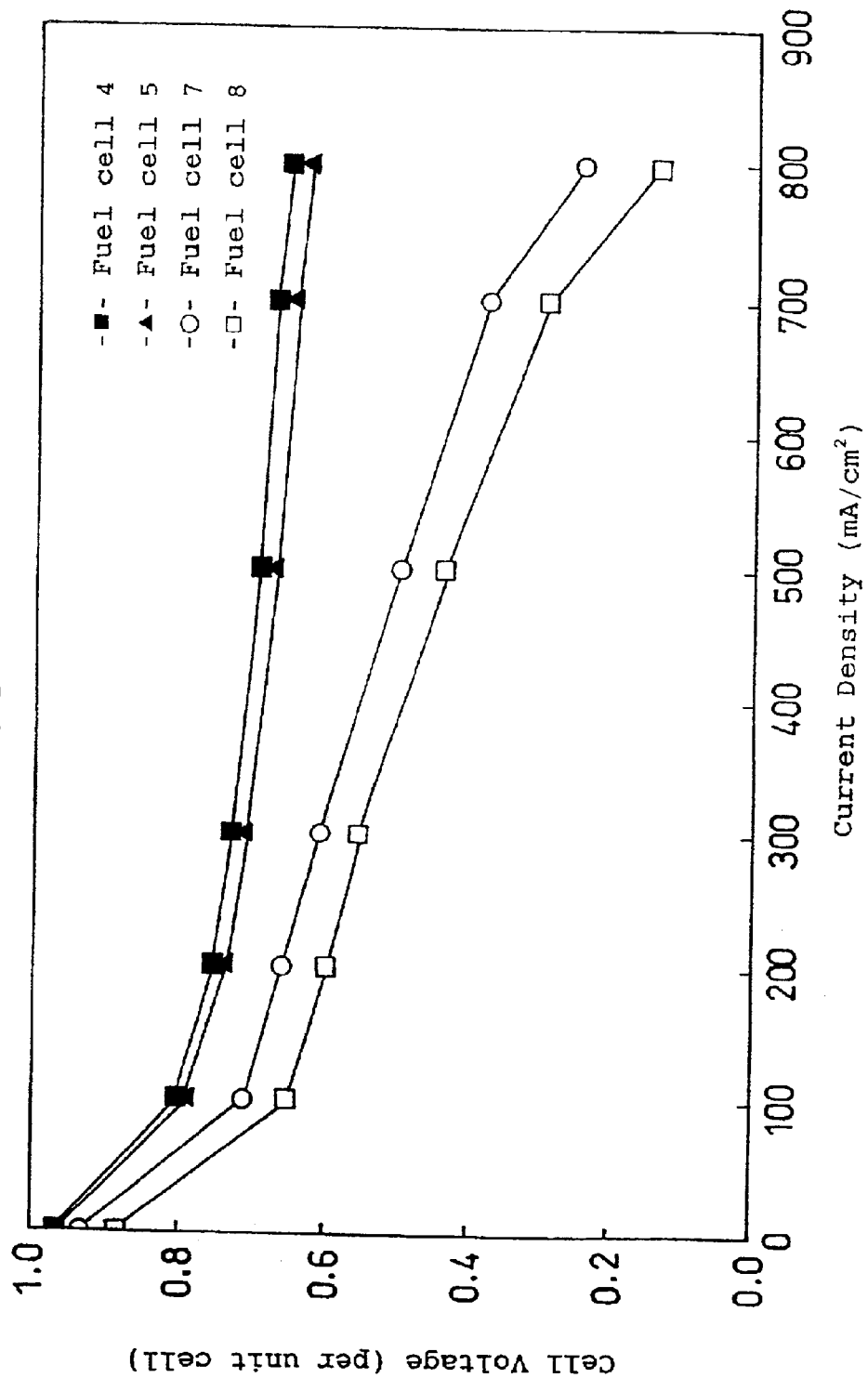
FIG. 9 a graph showing discharge characteristics of fuel cells manufactured in Examples and Comparative Examples of the present invention.

FIG. 8 shows discharge characteristics of the fuel cells 1 to 3 of Examples according to the present invention and the fuel cell 6 of Comparative Example. FIG. 9 shows discharge characteristics of the fuel cells 4 and 5 of Examples according to the present invention and the fuel cells 7 and 8 of Comparative Examples. As clearly understood from FIGS. 8 and 9, the fuel cells of the present invention have better characteristics than the fuel cells of Comparative Examples.

EXAMPLES 8 to 10

An electrode including a catalyst layer and a gas diffusion layer was manufactured. Acetylene Black powder with 25% by weight of platinum particles having the mean particle diameter of approximately 30 Å carried thereon was used for the catalyst for electrode. An isopropyl alcohol dispersion of this catalyst powder was mixed with an ethyl alcohol dispersion of the above perfluorocarbon sulfonate powder expressed by Formula (1) to give a catalyst paste.

Carbon paper as a conductive porous base material constituting the gas diffusion layer of the electrode was subjected to water-repellent treatment. Acetylene black was dispersed in an aqueous dispersion of fluorocarbon resin (Neoflon ND-1 manufactured by Daikin Industries LTD.) to yield a slurry (fluorocarbon resin solid matter:Acetylene Black=1:1 (ratio by weight)). This slurry was applied on non-woven carbon fabric 11 having the thickness of 360 $\mu$m (TGP-H-120 manufactured by Toray Industries, Inc.), dried, and heated at 380° C. for 30 minutes to give a gas diffusion layer having water repellency. For the sufficient gas diffusion property and conductivity of the gas diffusion layer, the amount of the slurry to be applied was adjusted to make the dried gas diffusion layer have the Gurley constant of 1 to 60 (seconds/100 ml). The evaluation of the Gurley constant followed JIS-P8117. The smaller Gurley constant causes a coarse gas diffusion layer and worsens the conductivity. On the contrary, the larger Gurley constant causes a dense gas diffusion layer and worsens the gas permeability.

The catalyst paste was applied on one surface of the non-woven carbon fabric as the water-repellent gas diffusion layer by screen printing to form a catalyst layer. A part of the catalyst layer was embedded in the non-woven carbon fabric. This gave an electrode 33 including a catalyst layer 32 and a gas diffusion layer 31 (see FIG. 10). The adjusted amount of platinum contained in the catalyst was 0.5 mg/cm$^2$, and the adjusted amount of perfluorocarbon sulfonate was 1.2 mg/cm$^2$.

Figure 10:
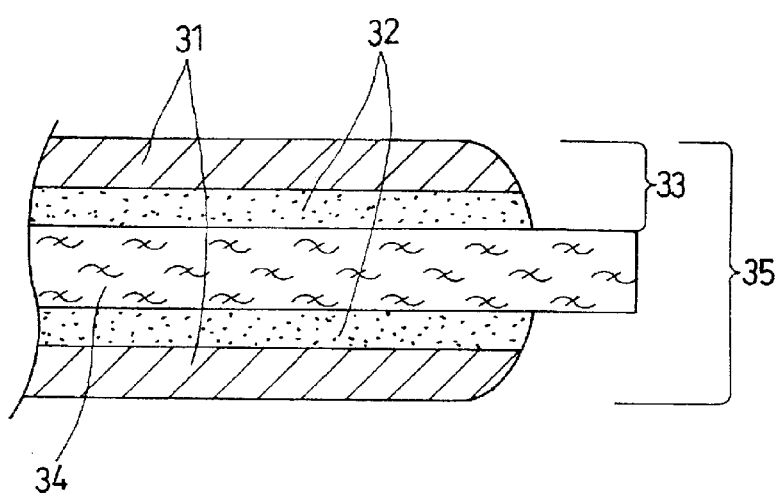
FIG. 10 is a graph showing discharge characteristics of fuel cells manufactured in Examples and Comparative Examples of the present invention.

Two electrodes 33 were arranged on the surface and the rear surface of a hydrogen ion-conductive polymer electrolyte membrane 34 having a greater outer dimension by 2 mm than the electrode 33, such that the catalyst layers 32 were in contact with the electrolyte membrane 34, and the two electrodes 33 and the electrolyte membrane 34 were joined together by hot pressing at 130° C. for 5 minutes under the pressure of 38 kgf/cm$^2$ to give an MEA 35 shown in FIG. 10. Here the perfluorocarbon sulfonate membrane of 50 $\mu$m in thickness expressed by the above Formula (1) (m=2) was used for the hydrogen ion-conductive polymer electrolyte membrane.

In the same manner as Example 3, a single cell was obtained by interposing the MEA thus manufactured between a pair of the separator plates (bipolar plates) with the gas flow paths shown in FIG. 6 or FIG. 7.

After such two single cells were stackd, a conductive separator plate with the flow path for cooling water was laid as a cooling element on every two single cells.

A stack was prepared by laying a total of 40 single cells one upon another in this manner, and a pair of metal collector plates, a pair of insulator plates composed of an electrically insulating material, and a pair of end plates are arranged on both surfaces of the stack and fixed with a clamping rod to give a stack. The clamping pressure per unit area of the conductive separator plate was 10 kgf/cm$^2$.

Figure 11:
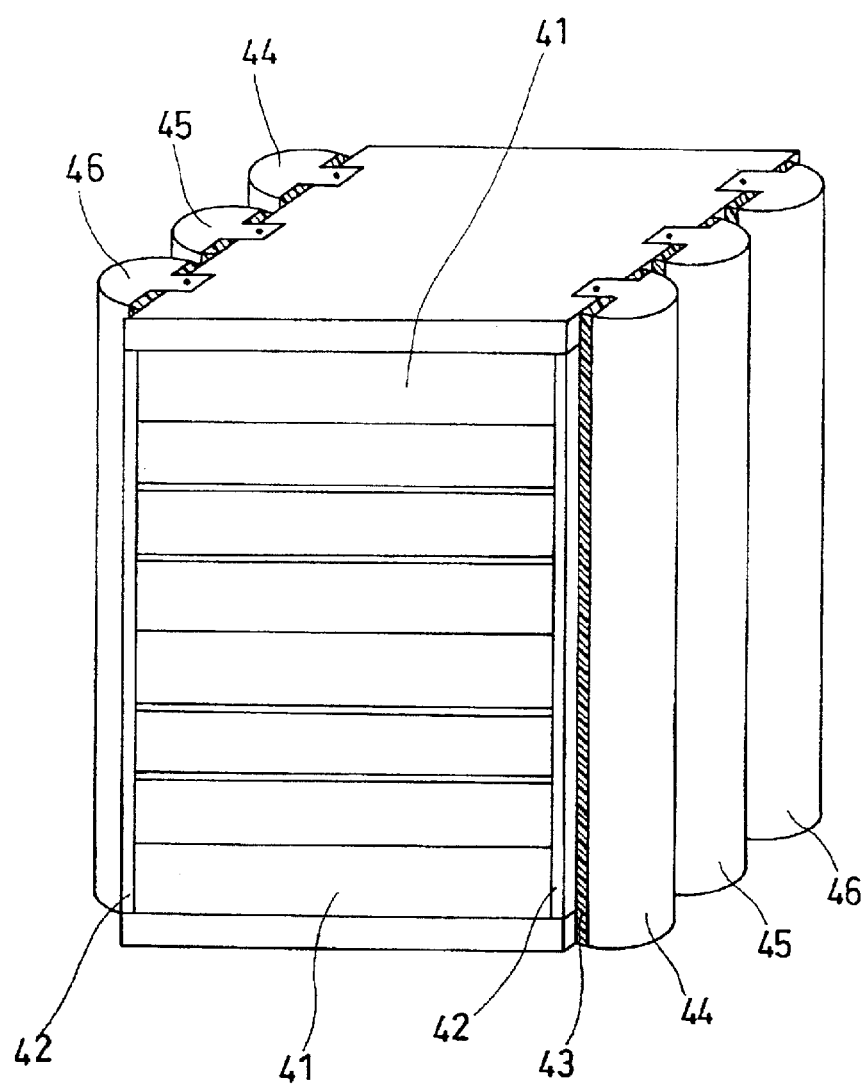
FIG. 11 is a perspective view schematically illustrating fuel cells manufactured in one Example of the present invention.

Manifolds shown in FIG. 11 were attached to the stack thus obtained. A pair of metal end plates 41 of SUS304 were arranged on the upper and lower portions of the stack. A pair of insulators 42 were disposed on respective side surfaces of the stack, and manifolds 44 and 45 were attached to the stack via gaskets 43. The manifold 44 feeds the supply of hydrogen to the anode, the manifold 45 feeds the supply of cooling water. And, the manifold 46 feeds the supply of the air to the cathode. This gave a fuel cell A as Example 8 of the present invention.

A supply of pure hydrogen gas as the fuel gas and a supply of the air as the oxidant gas were respectively fed through a deionized water bubbler kept at 75° C. and through a deionized water bubbler kept at a preset temperature to this fuel cell A and, further, with a supply of cooling water, the fuel cell A was subjected to the power generation test. At this time, the fuel gas, the oxidant gas and the cooling water were introduced in the same direction, and the gas outlets were open to ordinary pressure. The amount of cooling water was regulated, and the temperature of the fuel cell A was kept at 75° C., and the fuel cell A was operated and tested for the current-voltage characteristic under the conditions of the hydrogen utilization of 70%, the oxygen utilization of 40%, the hydrogen humidification bubbler temperature of 75° C., and the air humidification bubbler temperature of 65° C. The result of the test is shown in FIG. 12.

Figure 12:
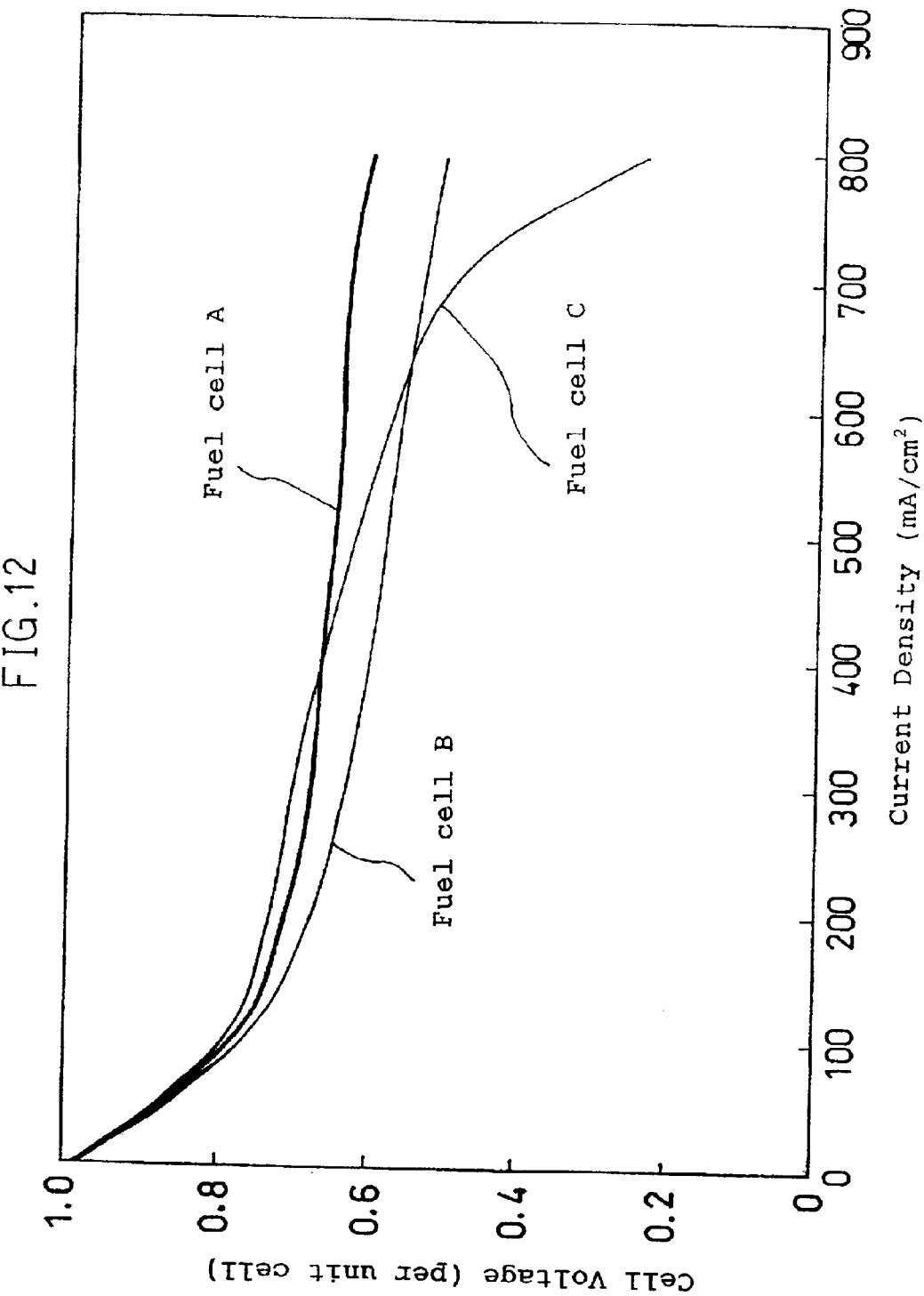
FIG. 12 is a graph showing discharge characteristics of fuel cells manufactured in Examples and Comparative Examples of the present invention.

For the purpose of comparison, the evaluation results of a fuel cell B having the Gurley constant of 0.5 in the gas diffusion layer and a fuel cell C having the Gurley constant of 70 in the gas diffusion layer were shown in FIG. 12. The structures of the fuel cells B and C were identical with that of the fuel cell A, except the Gurley constant in the gas diffusion layer.

As shown in FIG. 12, the relatively low conductivity of the fuel cell B and the relatively low gas diffusion property of the fuel cell C slightly lowered the respective cell performances in the high current density range. The high gas diffusion property was compatible with the high conductivity in the fuel cell A, so that the fuel cell A had the better characteristic than the fuel cells B and C.

The excellent characteristics equivalent to those of these Examples were attained by setting the gas permeability of the gas diffusion layer in the cathode equal to 1.2 to 2.0 times the gas permeability of the gas diffusion layer in the anode.

The excellent characteristics equivalent to those of these Examples were attained by setting the porosity of the gas diffusion layer in the cathode equal to 1.2 to 2.0 times the porosity of the gas diffusion layer in the anode.

EXAMPLE 11

A fuel cell D was produced in the same manner as the fuel cell A of Example 8, except that the thickness of carbon paper used as the conductive porous base material constituting the gas diffusion layer was varied to make the thickness of the gas diffusion layer in the cathode equal to 1.5 times the thickness of the gas diffusion layer in the anode. The fuel cell D had a sufficient evaporation area on the side of the cathode, which required evaporation of the product water, and safe and quick discharge of the excess water content are ensured and deterioration of the cell performance due to wetting is effectively prevented.

Figure 13:
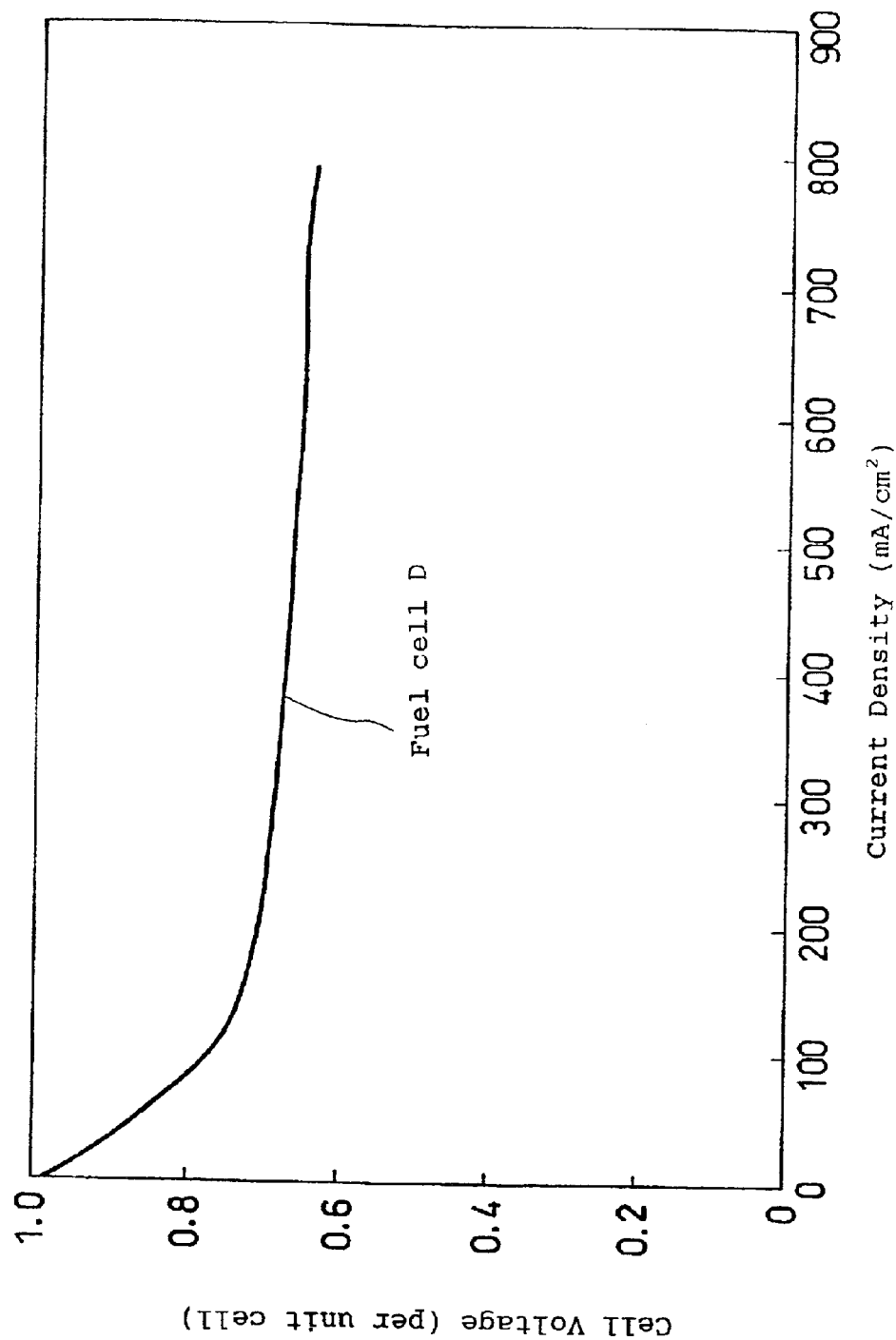
FIG. 13 is a graph showing discharge characteristics of fuel cells manufactured in Examples and Comparative Examples of the present invention.

The fuel cell D was subjected to the current-voltage characteristic evaluation test under the same conditions as those of Example 8. The results of the evaluation are shown in FIG. 13. FIG. 13 shows that the fuel cell D of Example 11 had the characteristic substantially equivalent to that of the fuel cell A of Example 8.

EXAMPLE 12

In the fuel cells of Examples 8 to 11, the Gurley constant of the gas diffusion layer is affected by the pressure applied in the process of manufacturing the MEA and the stack. In the process of manufacturing the fuel cell A of Example 8, the applied pressure for hot pressing the MEA was regulated to make the thickness of the pressed gas diffusion layer equal to 75 to 90% of the original thickness of the non-pressed gas diffusion layer.

Fuel cells ED F, and G were produced in the same manner as the fuel cell A of Example 8 except that the pressure for hot pressing the MEA was respectively set equal to 35, 20, and 50 kgf cm$^2$. This Example varied the pressure for hot pressing the MEA and evaluated the effects thereof, and the results of the evaluation are shown in FIG. 14.

Figure 14:
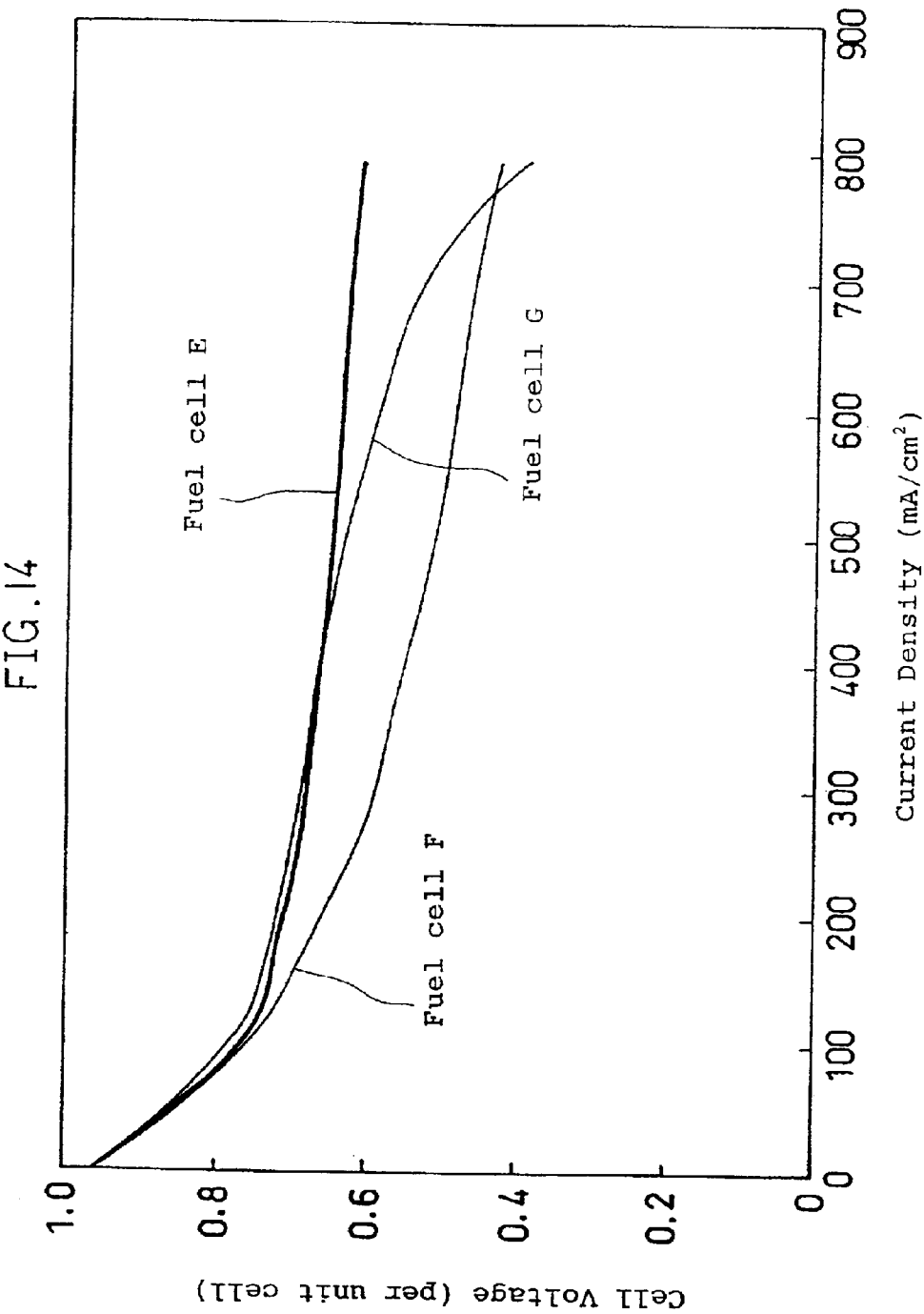
FIG. 14 is a graph showing discharge characteristics of fuel cells manufactured in Examples and Comparative Examples of the present invention.

As clearly understood from FIG. 14, the fuel cell G exposed to the excessively large pressure had the thickness of approximately 70% of that of the fuel cell E, and the gas diffusion layer was buckled and the gas permeability was extremely lowered to deteriorate the characteristic in the high current density range. The fuel cell F exposed to the insufficient pressure had the thickness of approximately 130% of that of the fuel cell E, and the contact resistance was increased to totally lower the voltage.

EXAMPLE 13

This Example increased the electrode area in the stack of Example 8 and had the thinner and denser a part of the gas diffusion area in contact with the rib and the thicker and coarser a part of the gas diffusion area corresponding to the gas flow path along the pattern of the gas flow path formed in the conductive separator plate. A fuel cell H was produced in the same manner as the fuel cell A of Example 8, except that the thickness of the denser part of the gas diffusion layer was 70 to 95% of the thickness of the coarser part.

The gas flowing through the gas flow path passes through the gas diffusion layer and reaches the catalyst layer in the fuel cell H. The high gas permeability of the gas diffusion layer in contact with the rib causes a gas to be transported between the adjoining gas flow paths via the part of the gas diffusion layer having the high gas permeability, and this prevents sufficient supply of the gas over the whole area of the MEA along the gas flow path. The greater electrode area makes it more difficult to sufficiently supply the gas over the whole area of the MEA. The low gas permeability, on the other hand, results in an insufficient supply of the gas to the catalyst layer located at the position corresponding to the rib and may lower the cell performances. It is accordingly required to appropriately lower the gas permeability in a part of the gas diffusion layer that is in contact with the rib.

The gas diffusion layer functions to collect electrons produced by the reaction and transport the electrons from the gas flow path to the rib. In the case where the thicker portion and the thinner portion of the gas diffusion layer have an identical density, the arrangement of thickening the gas diffusion layer located in the gas flow path and increasing its sectional area is advantageous for the desired conductivity.

The fuel cell H was subjected to the current-voltage characteristic evaluation test under the same conditions as those of Example 8. The results of the evaluation are shown in FIG. 15. As clearly shown in FIG. 15, the fuel cell H of Example 13 having a large electrode area has the characteristic substantially equivalent to that of the fuel cell A of Example 8.

INDUSTRIAL APPLICABILITY

As described above, according to the present invention, an excellent polymer electrolyte fuel cell having a high discharge characteristic or more specifically a high current-voltage characteristic in a high current density range can be obtained by varying the degree of water repellency in the anode and the cathode according to the position. In addition, according to the present invention, an excellent polymer electrolyte fuel cell having high discharge performances can be obtained by optimizing the water repellency, the specific surface area, the primary particle diameter, and the DBP absorption quantity of carbon powder in the gas diffusion layer of the anode and the cathode.

What is claimed is:

1. A polymer electrolyte fuel cell comprising a single cell having a cathode and an anode that are arranged across a hydrogen ion-conductive polymer electrolyte membrane, and a pair of conductive separator plates that are disposed outside said anode and said cathode and have gas flow paths for supplying and discharging a fuel gas and an oxidant gas to and from said anode and said cathode respectively, wherein each of said cathode and said anode comprises a particulate catalyst, a hydrogen ion-conductive polymer electrolyte, a conductive porous base material and a water repellent agent, and water repellency of at least one of said cathode and said anode varies in a direction of thickness or in a plane direction, characterized in that the water repellency of said conductive porous base material varies in the direction of thickness and is higher on a side of said conductive separator plate than on a side of said hydrogen ion-conductive polymer electrolyte membrane, or that the water repellency of said conductive porous base material varies in the plane direction and is higher on a gas outlet side of said separator than on a gas inlet side of said separator.

2. A polymer electrolyte fuel cell comprising a single cell having a cathode and an anode that are arranged across a hydrogen ion-conductive polymer electrolyte membrane, and a pair of conductive separator plates that are disposed outside said anode and said cathode and have gas flow paths for supplying a fuel gas and an oxidant gas to said anode and said cathode respectively, wherein each of said cathode and said anode comprises a particulate catalyst, a hydrogen ion-conductive polymer electrolyte, a conductive porous base material, and a water repellent agent, and water repellency of said cathode is higher than water repellency of said anode.

3. The polymer electrolyte fuel cell in accordance with claim 2, wherein the gas permeability of said conductive porous base material is 1 to 60 second/100 ml as a Gurley constant.

4. The polymer electrolyte fuel cell in accordance with claim 2, wherein the gas permeability of said conductive porous base material in said cathode is 1.2 to 2.0 times the gas permeability of said conductive porous base material in said anode.

5. The polymer electrolyte fuel cell in accordance with claim 2, wherein the porosity of said conductive porous base material in said cathode is 1.2 to 2.0 times the porosity of said conductive porous base material in said anode.

6. The polymer electrolyte fuel cell in accordance with claim 2, wherein the thickness of said conductive porous base material in said cathode is 1.2 to 3.0 times the thickness of said conductive porous base material in said anode.

7. The polymer electrolyte fuel cell in accordance with claim 2, wherein each of said cathode and said anode comprises a catalyst layer that is joined with said hydrogen ion-conductive polymer electrolyte membrane, and a gas diffusion layer that is in contact with said conductive separator plate, said catalyst layer is mainly composed of a catalyst particles carried on carbon particles and a hydrogen ion-conductive polymer electrolyte, said gas diffusion layer is mainly composed of a conductive porous base material containing carbon particles, and water repellency of said carbon particles included in said gas diffusion layer is higher than water repellency of said carbon particles included in said catalyst layer, and the water repellency of at least one of said cathode and said anode varies in the direction of thickness.

8. The polymer electrolyte fuel cell in accordance with claim 7, wherein said carbon particles included in said gas diffusion layer is disposed at a joint between said catalyst layer and said conductive porous base material.

9. The polymer electrolyte fuel cell in accordance with claim 7, wherein a specific surface area of said particulate carbon included in said gas diffusion layer is not greater than ½ a specific surface area of said carbon particles included in said catalyst layer.

10. The polymer electrolyte fuel cell in accordance with claim 7, wherein a primary particle diameter of said particulate carbon included in said gas diffusion layer is not less than 1.3 times a primary particle diameter of said carbon particles included in said catalyst layer.

11. The polymer electrolyte fuel cell in accordance with claim 7, wherein a DBP absorption of said carbon particles included in said gas diffusion layer is not greater than ⅔ a DBP absorption of said carbon particles included in said catalyst layer.

12. A polymer electrolyte fuel cell comprising a single cell having a cathode and an anode that are arranged across a hydrogen ion-conductive polymer electrolyte membrane, and a pair of conductive separator plates that are disposed outside said anode and said cathode and have gas flow paths for supplying and discharging a fuel gas and an oxidant gas to and from said anode and said cathode respectively, wherein each of said cathode and said anode comprises a particulate catalyst, a hydrogen ion-conductive polymer electrolyte, a conductive porous base material and a water repellent agent, and wherein water repellency of at least one of said cathode and said anode varies in a plane direction.

13. The polymer electrolyte fuel cell in accordance with claim 12, wherein the gas permeability of said conductive porous base material is 1 to 60 second/100 ml as a Gurley constant.

14. The polymer electrolyte fuel cell in accordance with claim 12, wherein each of said cathode and said anode comprises a catalyst layer that is joined with said hydrogen ion-conductive polymer electrolyte membrane, and a gas diffusion layer that is in contact with said conductive separator plate, and wherein said catalyst layer is mainly composed of a catalyst particles carried on carbon particles and a hydrogen ion-conductive polymer electrolyte, and wherein said gas diffusion layer is mainly composed of a conductive porous base material containing carbon particles.

15. The polymer electrolyte fuel cell in accordance with claim 14, wherein said carbon particles included in said gas diffusion layer is disposed at a joint between said catalyst layer and said conductive porous base material.

16. The polymer electrolyte fuel cell in accordance with claim 14, wherein a specific surface area of said particulate carbon included in said gas diffusion layer is not greater than ½ a specific surface area of carbon particles included in said catalyst layer.

17. The polymer electrolyte fuel cell in accordance with claim 14, wherein a primary particle diameter of said particulate carbon included in said gas diffusion layer is not less than 1.3 times a primary particle diameter of said carbon particles included in said catalyst layer.

18. The polymer electrolyte fuel cell in accordance with claim 14, wherein a DBP absorption of said carbon particles included in said gas diffusion layer is not greater than ⅔ a DBP absorption of said carbon particles included in said catalyst layer.

* * * * *